United States Patent
Kakuta et al.

(10) Patent No.: US 6,714,965 B2
(45) Date of Patent: *Mar. 30, 2004

(54) GROUP CONTACTING SYSTEM, AND RECORDING MEDIUM FOR STORING COMPUTER INSTRUCTIONS FOR EXECUTING OPERATIONS OF THE CONTACT SYSTEM

(75) Inventors: Jun Kakuta, Kawasaki (JP); Hiroyasu Sugano, Kawasaki (JP); Kazuki Matsui, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/237,908

(22) Filed: Jan. 27, 1999

(65) Prior Publication Data
US 2003/0093474 A1 May 15, 2003

(30) Foreign Application Priority Data

Jul. 3, 1998 (JP) .......................................... 10-189004

(51) Int. Cl.$^7$ ............................................. G06F 15/16
(52) U.S. Cl. ....................... 709/204; 709/205; 709/217; 709/218; 709/219
(58) Field of Search ................................. 709/204, 205, 709/206, 217–219, 227, 228, 313, 207, 249; 345/737–747; 370/260

(56) References Cited

U.S. PATENT DOCUMENTS

| 5,713,019 | A | * | 1/1998 | Keaten .................... 707/10 |
| 5,737,538 | A | * | 4/1998 | Wilhite .................... 345/744 |
| 5,764,916 | A | * | 6/1998 | Busey et al. ............. 707/501.1 |
| 5,778,187 | A | * | 7/1998 | Monteiro et al. .......... 370/351 |
| 5,796,393 | A | * | 8/1998 | MacNaughton et al. .... 345/733 |
| 5,828,839 | A | * | 10/1998 | Moncreiff .................... 709/204 |
| 5,841,977 | A | * | 11/1998 | Ishizaki et al. ............. 345/501 |
| 6,205,478 | B1 | * | 3/2001 | Sugano et al. ............. 709/223 |
| 6,212,548 | B1 | * | 4/2001 | DeSimone et al. ......... 709/204 |
| 6,249,806 | B1 | * | 6/2001 | Kohda et al. ............... 709/206 |
| 6,301,607 | B2 | * | 10/2001 | Barraclough et al. ....... 709/204 |
| 6,345,290 | B2 | * | 2/2002 | Okada et al. ............... 709/203 |

FOREIGN PATENT DOCUMENTS

JP        9-261222        10/1997

* cited by examiner

Primary Examiner—Rupal Dharia
Assistant Examiner—Q Nguyen
(74) Attorney, Agent, or Firm—Staas & Halsey

(57) ABSTRACT

A group contact system includes a server 4 for managing user information, and a plurality of user terminals (2) which mutually and commonly engage in a communication service operated on the server. The user terminal (2) includes a card forming instruction means (5) and a content acquiring means (9). The server (4) includes a user information storage means (7) and a card forming means (8). Members who establish communications in, for instance a chat of the communication service, are eligible to be designated a group member. Anyone using the service can request that the server form a group card. Every item to be included in the group card has an access level that may be set by a user so that certain items may be excluded from the group card. As a result, the group card for user A may not have the same items as a corresponding card for user B. The group members acquire the formed group card and save the content of the formed group card. The invention also permits any group member to mutually make contact with other members by using the information on the card to access another communication means such as a telephone or a facsimile. Also, a snapshot of each member of the group members may be included on the card. Therefore, a friendship may develop among the group members.

16 Claims, 21 Drawing Sheets

Fig. 13 SCREEN MADE AFTER BEING CONNECTED TO SERVER

Fig. 17

CONTACT WINDOW

| SELECT CONTACT COUNTER PARTY AND MEANS | | | | TRANSMISSION TEXT |
|---|---|---|---|---|
| TAKAKO | | | | |
| ELECTRONIC MAIL | takako@abc.ac.jp | ☐ | | |
| TELEPHONE No. | XXXXXXXXX | ☐ | | |
| FACSIMILE No. | XXXXXXXXX | ☐ | | |
| TELEPHONE PAGER | 03-0000-1234 | ☑ | | |
| KEI | | | | |
| ELECTRONIC MAIL | Kei@def.co.jp | ☑ | | |
| TELEPHONE No. | 06-021-9876 | ☐ | | |
| TELEPHONE PAGER | XXXXXXXXX | ☐ | | |
| OK | | | CANCEL | |

MAIN PROCESS OPERATION IN USER TERMINAL

GROUP CONTACTING SYSTEM, AND RECORDING MEDIUM FOR STORING COMPUTER INSTRUCTIONS FOR EXECUTING OPERATIONS OF THE CONTACT SYSTEM

BACKGROUND OF THE INVENTION

A. Field of the Invention

The present invention relates to a method and apparatus for initiating and conducting communications between users via a network or the Internet. More specifically, the present invention is directed to a technique for initiating and conducting communications between users geographically located apart from one another such that the users may acquire and utilize each other's profiles.

B. Description of Related Art

There are services available whereby a "mailing list" may be used to provide information to a plurality of users where the users are part of a group. Using such a service, communications with the plural users in the group can be readily established. In this "mailing list" service, electronic mail addresses of the plurality of users are registered on a server computer. One electronic mail address may be configured to designate mail for each respective user in the group, and when an electronic mail is sent to the designated address, the electronic mail is transmitted to all of the registered users.

There are also local businesses whereby a snapshot may be taken of a person with backgrounds where the backgrounds have something related to the local environment. Such snapshot businesses operate without a network or use of the internet. For instance, there are photo shops and photo-machines that provide what is referred to as a "Print Club" service. Such "Print Club" services are typically installed in a shopping center or shopping mall. Such a "Print Club" service may include a machine that photographs a person to make a commemorative picture whereby the background may indicate the location of the individual at the time the snapshot was taken. The machine immediately prints out a sheet of small stick-on photographs so that people, especially teenagers, can exchange the photographs with others or attach it to a page in a notebook. There are also application software programs that are available for use on a personal computer, and are capable of manipulating a photograph to add a background thereto. Moreover, recent developments have been made in digital camera technology where by background may be inserted into a digitized photograph.

As another apparatus capable of providing a similar service via a network is, for example, a "Houkago Club" (after-school club) service. Similar to the above-described "Print Club" service providing apparatus, the "Houkago Club" service includes an apparatus that is installed in a central part of town or in a shopping center. The service photographs a person and a commemorative picture is made. Thereafter the commemorative picture is printed as a seal. In addition, the "Houkago Club" service provides an apparatus that may transfer digitized data based upon the commemorative picture to a server connected to the Internet so that the picture can be opened on a WWW (World Wide Web) page.

As mentioned above, the following services are available, for example, the service capable of handling a plurality of users as one group, and also the service capable of effectively establishing the communications with the plural users who are grouped together. However, in the above-explained conventional services, it is difficult for the users to freely select another party or user to join the group or make up a new group easily. In certain known services, since the email addresses are manually grouped, the names are given to the user groups and all users belonging to the groups may contact one another. However, in this known service, the electronic mail addresses of the grouped users are manually registered by the users. Also, since these mail addresses must be grouped together somehow via some communication means, a cumbersome procedure is required in order for the users to be identified. Therefore, the users cannot be grouped together in a flexible manner. In addition, while the users are grouped, no access restriction can be made in the user information, so that no special care is taken to secure the user information.

On the other hand, as the Internet rapidly progresses, opportunities where one person may become acquainted with other persons via communications on the Internet are likewise increasing. As communications develop between respect to various persons, it is possible for those persons to communicate over the Internet using text characters, electronic mail equivalent to letter communication made on the Internet, and also chat services are available. As well, there are services in which users may assume the role of a graphic character and manipulate the graphic character in a virtual world and further communicate with others using gestures and expressions of emotions by manipulations of the graphic character, via the Internet.

However, even though a person can get acquaint with other persons using such services, if the person interrupts his or her communication with the service, there may be no further connection between the person and other persons. In other words, a person may interact with another person in one of the above services but is not able to continue with that interaction outside the service. That is, while such services may be used to establish and develop friendships between one person and another person or persons, there is currently no easy way to continue the friendship and contact between the persons outside the services and the confines of the network or Internet.

SUMMARY OF THE INVENTION

One object of the present invention is to provide a group contact system and a recording medium for recording thereon, a program used to progress communications established between users who meet with other users via a network, the program utilizing their profiles and communication information of respective users.

The present invention has been developed to solve the above described problems. Specifically, the present invention includes means for extending communications and exhanges of some individual information between respective users accessing a service on a network such as the Internet. Therefore, when a user is in communication with another user in, for instance, a chat on the Internet, it is possible with the present invention to extend those communications by creating a record or card based upon selected users who are participating in the chat. The card may have any of a variety of information selected by each user, including an image or photograph representing that user. The card can therefore include a snapshot that includes any one or all of the selected users and therefore even after a chat on the Internet is finished, each selected user can utilize the series of information in the group information to establish new communications outside of the communication service. The snapshot may further be in the form of a "commemorative picture" of users who constitute a group. Furthermore, since the user information is distributed based upon the information each user wishes to divulge, human relationships can be made in a safe manner.

In accordance with a first aspect of the present invention, there is a group contact system that includes a plurality of first information terminals and a second information terminal. The first information terminals mutually communicate in real time via a communication service over a network. The second information terminal manages information of users on the network. Each of the first information terminals includes means for selecting members of a group by a selecting user for designating at least one other user as a designated user to form the group of designated users with the selecting user. Corresponding group information includes identification of the designated users in the group. Each of the designated users and the selecting user communicate over the network using corresponding ones of the first communication terminals. The second information terminal includes a user information storing means for storing individual information of each user. The user information includes information identifying each user and a corresponding one of the first information terminals on the network utilized by the user to access the communication service. A means for compiling group information compiles user information relating to each designated user and forms group information in response to the selecting means in the first information terminal.

In the first user terminal, the selecting means provides a way to designate one or all users who are accessing the communication service to be part of a group who share information. This operation can occur without disrupting the communication service. In the second information terminal, the compiling group information means creates group information based on the designated user information stored in the user information storing means.

In accordance with a second aspect of the present invention, each of the first information terminals further includes means for acquiring the contents of the compiled group information relating to each of the designated users in the group from the second information terminal.

Preferably, in a third aspect of the present invention, the group contact system, as set forth in the second aspect of the present invention, is such that the first information terminal further includes acquisition confirming means configured to receive notification of compiled group information to be transmitted from the second information terminal via the network. The acquisition confirming means is further formed to notify to the content acquiring means of incoming transmission of the compiled group information. The content acquiring means further is also configured to receive the group information based upon notification issued from the acquisition confirming means.

Preferably, in a fourth aspect of the present invention, the group contact system as set forth in the second aspect of the present invention is such that the first information terminal is connected to an external communication apparatus. The first information terminal further includes communication control means configured to access the external communication apparatus in response to selection by the corresponding user at the first information terminal of one designated user of the compiled group information. The communication control means is further configured to contact the one designated user via the external communication apparatus.

In a fifth aspect of the present invention, the group contact system as set forth in the second aspect of the present invention is such that the second information terminal further includes identification information forming means for forming the identification information in the group information.

In a sixth aspect of the present invention, the group contact system as set forth in the second aspect of the present invention is such that the first information terminal further includes a snapshot forming instruction means for processing instructions relating to formation of a snapshot. The snapshot contains images representing each of the designated users in the group. The snapshot forming instruction means also is configured for transmitting the instructions to the second information terminal. The second information terminal further includes a snapshot forming means configured for forming the snapshot in response to the instructions from the snapshot forming instruction means. The snapshot forming means is configured to compile image information about each designated user in the group to produce a snapshot. The snapshot forming means is further configured for transmitting the snapshot to each of the first information terminals designated in the group information. The snapshot forming means is further configured for compiling group information to accompany the snapshot.

Preferably, in a seventh aspect of the present invention, the first information terminal further includes auxiliary information selecting means for selecting auxiliary visual information to be added to the snapshot and also for adding the selected auxiliary visual information to the instructions sent to the snapshot forming means. The second information terminal further includes a storage apparatus for storing therein contents of the auxiliary visual information. There is information adding means for reading the contents of the selected auxiliary visual information from the storage apparatus and also for adding the read contents to the snapshot.

In an eighth aspect of the present invention, the group contact system as set forth in the second aspect of the present invention is such that the first information terminal further includes output means for visually outputting the group information stored by the content acquiring.

In accordance with a ninth aspect of the present invention, a group contact managing apparatus manages user information communicated between a plurality of information terminals. The information terminals communicate with each other in real time via a communication service over a network. The group contact managing apparatus includes a means for operating the communication service and user information storing means for storing user information relating to users at respective user terminals. Further, there is a group information forming means for receiving a group information forming request from any one of the information terminals. The group information forming request includes a group list identifying designated users who define a group. Each of the designated users accesses the communication service from the respective information terminals, the group information forming means is further configured for forming group information containing user information relating to each of the designated users. The group information forming means is further configured for transmitting compiled group information to the information terminals of the designated users.

In a tenth aspect of the present invention, a group contact apparatus is connected to an information server that manages information related to users and their respective information terminals. The information server provides a communication service to the information terminals over a network. The group contact apparatus includes a group information forming instruction means or selecting means that is configured for designating users in communication with the communication service. The group information forming instructions means is also configured for requesting the information server to form group information simultaneously with the operation of the communication service between a plurality of group contact apparatus. A content acquiring means acquires formed group information from the information server and saving the acquired group information in storage.

In accordance with an eleventh aspect of the present invention, there is a computer readable recording medium for recording thereon a group contact management program employed in a second information terminal for managing user information communicated between a plurality of first information terminals which mutually and commonly communicate with one another via a communication service operated from the second information terminal. The group contact management program executes the following steps:

A) a user information storing step for storing information related to users at each of the first information terminals;

B) a group information forming step which compiles group information in response to a request from any one of the first information terminals, the request including a designation of users accessing the communication service who have been selected to be in a group, the group information including user information about each designated user; and C) a group information transmitting step for transmitting the compiled group information to each first information terminal corresponding to a respective one of the designated users.

In accordance with a twelfth aspect of the present invention, a computer readable recording medium stores thereon a group contact program employed in a first information terminal. A plurality of the first information terminals are mutually and commonly in communication with one another via a communication service operated from a second information terminal. The group contact program executes the following steps:

A) a group information instruction forming step wherein a selecting user selects at least one user as a designated user from users communicating via the communication service, the designated users to subsequently define a group with the selecting user, the first communication terminal thereafter transmitting formed instructions to the second communication terminal for subsequent formation of group information based upon the formed instructions, the group information instruction forming step allowing continued communication between respective ones of the first information terminals; and B) a content acquiring step for acquiring contents of the subsequently formed group information formed in response the group information instruction forming step.

In accordance with a thirteenth aspect of the present invention, there is a group communication method for effecting selection, designation and compilation of group information in conjunction with a communication service operated over a network communication system in which a plurality of users commonly communicate via the communication service. The method includes the steps of:

A) operating a communication service;

B) collecting user information from a plurality of users accessing the communication service and storing the information in a common storage space;

C) selecting at least one user from users accessing the communication service, the selected users defining a group of users;

D) requesting group information be compiled from the user information corresponding to the selected users in the group; and E) compiling group information corresponding to the selected users in the group in response to the request of step (D).

Preferably, the method further includes the step of:

F) forming a snapshot that includes image information corresponding to each selected user, the formed snapshot combined with the compiled group information; and G) transmitting the compiled group information and snapshot to each of the selected users.

Preferably, the step (D) further includes designation of a background for insertion into the snapshot formed in step (F).

BRIEF DESCRIPTION OF THE DRAWINGS

FIG. 17 is a diagram showing an example of a screen display as viewed from a user terminal, where the screen display shows an example of a contact window;

DESCRIPTION OF THE PREFERRED EMBODIMENT

In the following description of the present invention, an information terminal is not limited solely to an information terminal connected to a network, but may also be communicating/managing information system such as, for example, a work station (WS) and a personal computer (PC) or hand held device configured for connection to other computers or microprocessor driven devices. In the following description of the present invention, in particular with respect to FIGS. 1–8, various aspects of the present invention are separated from other aspects of the present invention and described separately in order to more clearly explain the function and processes performed by those aspects of the present invention.

Figure 1:
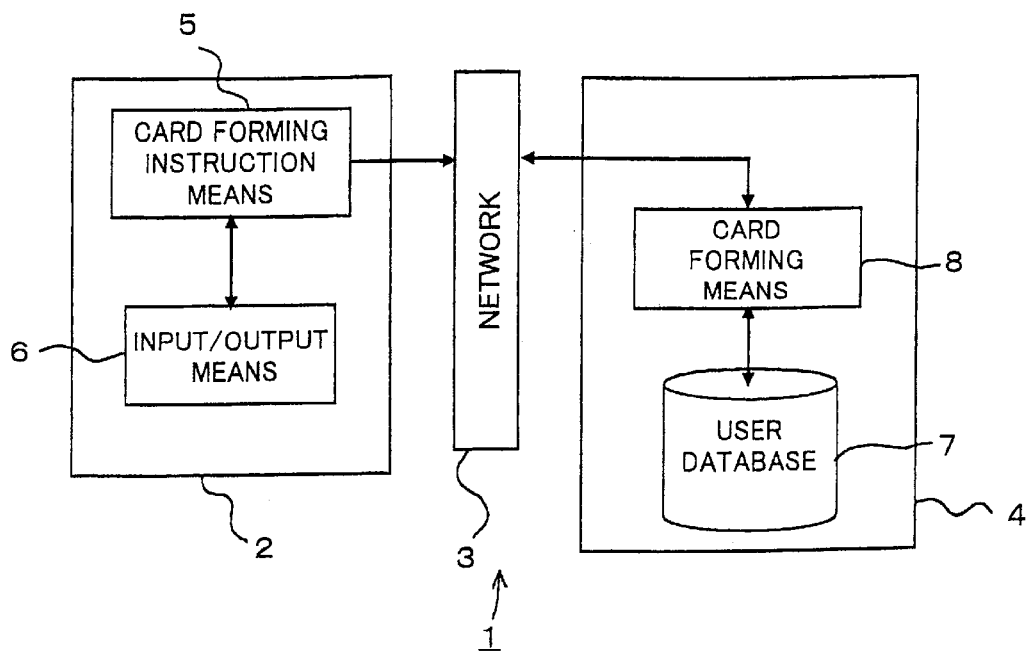
FIG. 1 is a block diagram showing a basic representation of a group contact system in accordance with the present invention.

In FIG. 1, there is shown a block diagram of a group contact system 1 according to the present invention. The group contact system 1 indicated in FIG. 1 is constructed of a plurality of user terminals 2 and a server 4 connected via a network 3 to the user terminals 2. For the sake of easy explanation, only one user terminal 2 is shown, but it should be understood that a plurality of user terminals 2 are assumed in use with the system 1. A plurality of user terminals 2 are connected to the network 3, and are capable of communicating with each other via the network 3 by employing an external application such as IRC (Internet Relay Chat) application software which may be operated on the respective user terminals 2. Such IRC applications may provide, for instance, via a separate server, a variety of channels on differing topics.

The user terminal 2 contains a card forming instruction means 5 and an input/output means 6. The input/output means 6 includes, for instance, a keyboard and monitor. The card forming instruction means 5 is configured to request the server 4 to form a group card, and operates as described below. The user A, for example, may become acquainted with a user B while on an IRC. The user A may then select the user B during the conversation designating the user B as being part of a new group or a previously defined group. A user list is created for each defined group. The user A may then request that a card (described in greater detail below) is to be formed based upon a selected group of users, where the users are identified in a corresponding user list. Each designated user may accept or reject the card, as is described in greater detail below.

In response to a card forming request from a user, the card forming instruction means 5 transmits a card forming request containing the user list to the server 4. The user list includes information necessary to identify each user in the group. The user list contains, for instance, IDs of the user's respective user terminals for each user in the group, and a nickname for each user as specified during use of the chat service. The input/output means 6 receives the card forming instruction and an input of other process, and outputs the respective process operations requested by the user, as is described in greater detail below.

The server 4 includes a user database (DB) 7 and a card forming means 8. The user DB 7 stores information related to users on a network. The stored information will hereinafter be referred to as user information. The user information may contain information specific to users on the network 3, personal user information, and images representing each of the users. The images are, for instance digital or scanned photographs. The user information includes a user ID, a nickname, an electronic mail address (e-mail address), an occupation, an office name, a hobby, an access level of each item (described in greater detail below), a file name of image information, as well as other information.

The card forming means 8 compiles user information relating to each of the users in the identified group from the user DB 7 based upon the card forming request from the user terminal 2. Thereafter, a group card is formed having the compiled user information. The group card is formed in accordance with the above mentioned access level information, where the access level information of each item of information in the user information is designated in advance by each user. The card forming means 8 issues a completion notification to the user terminal 2 after the group card has been formed.

Figure 2:
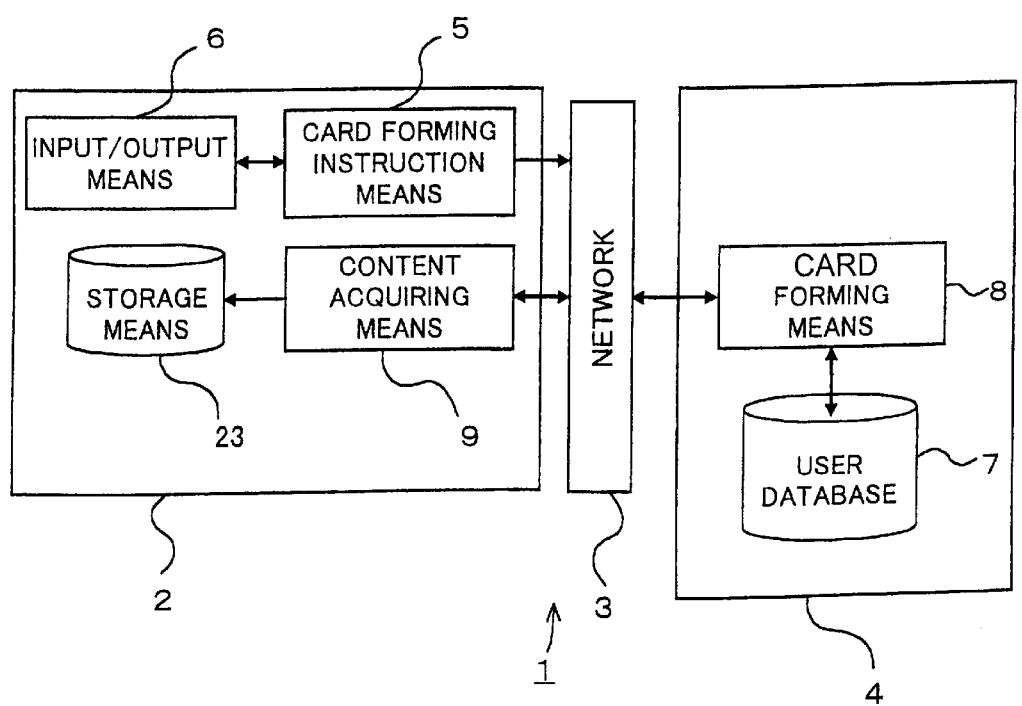
FIG. 2 is a block diagram showing further aspects of a server and a user terminal in the group contact system depicted in FIG. 1.

FIG. 2 shows an arrangement of another group contact system, wherein the user terminal 2 further includes a content acquiring means 9 and a storage means 23 in addition to the group contact system shown in FIG. 1. The content acquiring means 9 transmits a card transmission request to the server 4 when the content acquiring means 9 receives a card forming completion notification via the network 3 from the server 4. The content acquiring means 9 receives the group card issued in response to the above mentioned card transmission request, and the group card is permanently stored into the storage means 23. However, the group card may at any time be intentionally deleted by the user.

Figure 3:
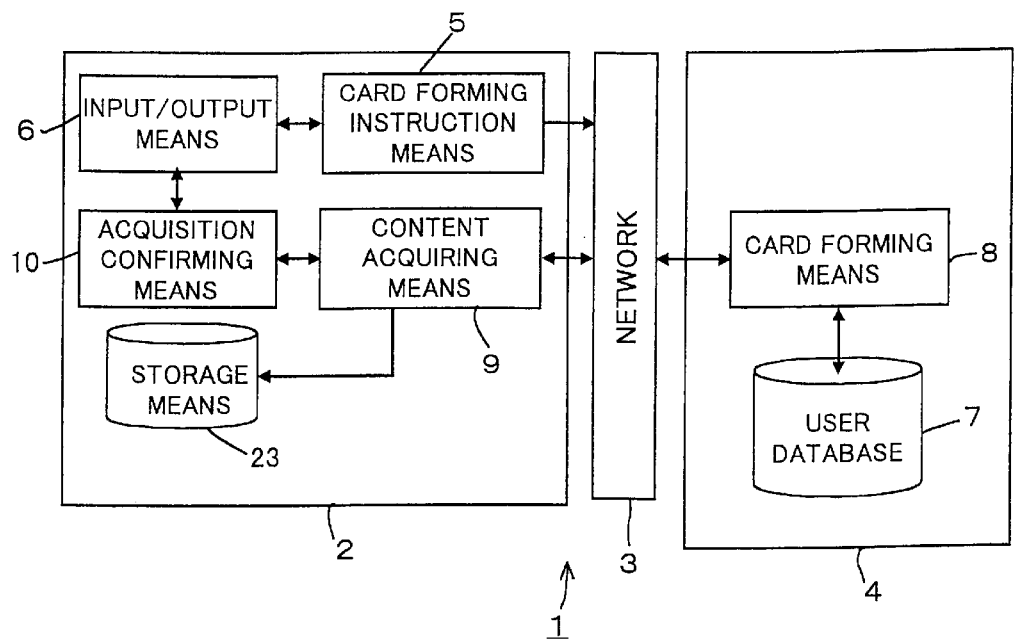
FIG. 3 is a block diagram showing one example of a group contact system which further includes an acquisition confirming means.

FIG. 3 shows an arrangement of another group contact system, wherein the user terminal 2 further includes an acquisition confirming means 10 added to the group contact system 1 depicted in FIG. 2. In this case, the content acquiring means 9 is configured to receives notification of an incoming card. The content acquiring means 9 send a notification to the acquisition confirming means 10 that a card has been formed and is ready to be received. The notification is in the form of a card forming completion notification. Upon receipt of the card forming completion notification, the acquisition confirming means 10 interrogates a user (via the input/output means 6) whether or not the group card is to be received or not. Thereafter, the acquisition confirming means goes into a waiting state where the acquisition confirming means waits for a response made by the user. When the response is entered, the acquisition confirming means 10 sends the response to the content acquiring means 9. The content acquiring means 9 either acquires the group card in response, or cancels the acquisition of the group card, depending on the choice made by the user. Alternatively, the above-described interrogation may be made only in cases where a group card is formed in response to instructions from another user. As a consequence, each user may determine in advance whether or not he or she wishes to acquire the group cards from others, and therefore consumption of storage space (on, for instance a hard drive) caused by storing an unwanted group card can be avoided.

Figure 4:
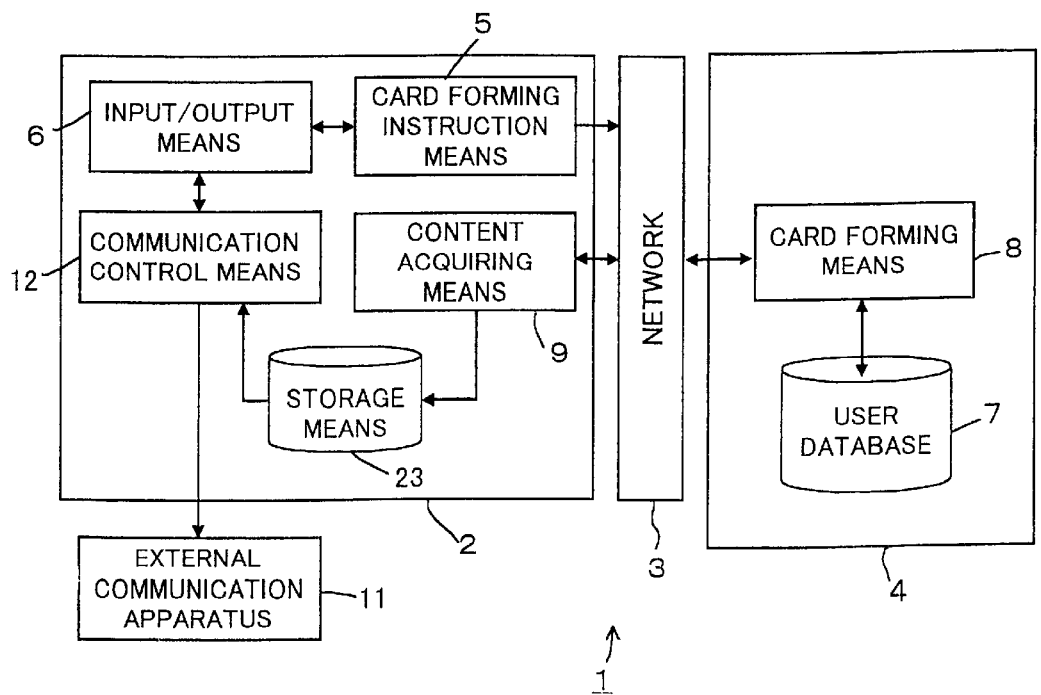
FIG. 4 is a block diagram showing another example of a group contact system which further includes a communication control means.

FIG. 4 schematically represents an arrangement of another group contact system, namely, the user terminal 2 is further constituted by an external communication apparatus 11 and a communication control means 12 in addition to the features described above with respect to the group contact system 1 of either FIG. 2 or FIG. 3. The external communication apparatus 11 is, for example, a telephone, a facsimile, a portable telephone, an electronic mail program, and the like.

The communication control means 12 is configured to identify and select any one of the group cards saved in the storage means 23, and further to select any one (or more) of the users within the selected group, and identify a communication means for communicating with the selected user (or users). Furthermore, the communication control means 12 accepts instructions for starting a communication with the selected user, and then controls the selected external communication means to execute a communication.

In other words, if a user wishes to contact another user identified in a group, the communication control means 12 provides a means of identifying the selected user and identifying a means for communications with the selected user, such as a telephone number. The communication control means 12 is configured to dial the phone number and therefore effect direct communication with the selected user.

Figure 5:
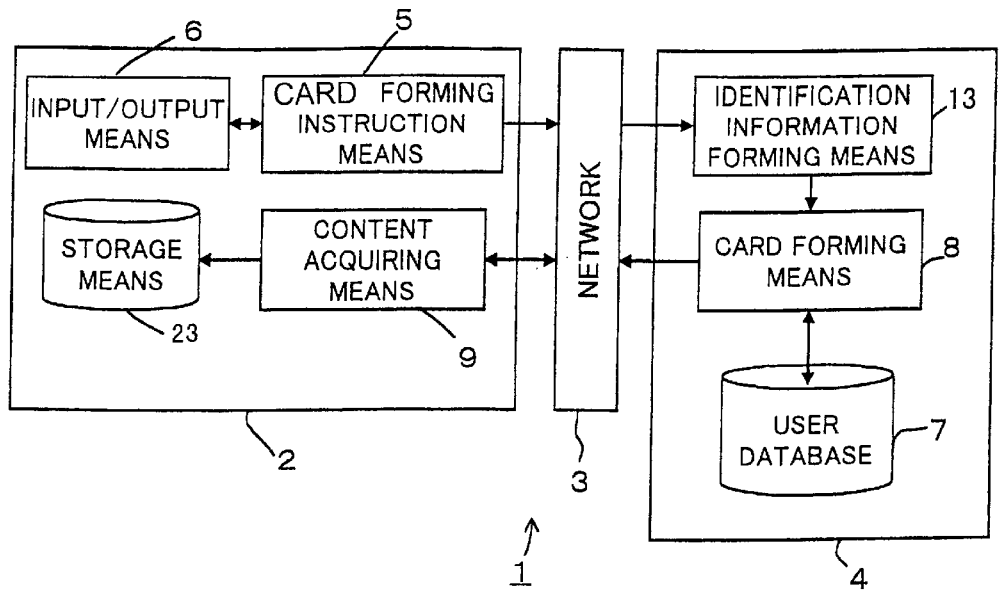
FIG. 5 is a block diagram showing a further example of a group contact system which includes an identification information forming means.

FIG. 5 shows an arrangement of another group contact system where the server 4 is further constituted by an identification information forming means 13 in addition to the features of the group contact system 1 of FIG. 2, or FIGS. 3 and 4. The identification information forming means 13 receives a group card forming request issued from the user terminal 2, and then creates identification information which is transmitted only to user terminals of users in the specified group. The formed identification information is sent to the card forming means 8 together with the group card forming request. The card forming means 8 then arranges the user information to form a group card, as is described in greater detail below. The card forming means 8 also keeps together with the formed card the identification information of the users in the selected group.

The identification information is acquired by the content acquiring means 9 in the user terminal 2 in combination with the contents of the group card, and is utilized so as to identify any changes subsequently made in the contents of the group card. As a result of the above described configuration, it is possible to avoid a case where other users not in the group might forge or alter the contents of the group card.

Figure 6:
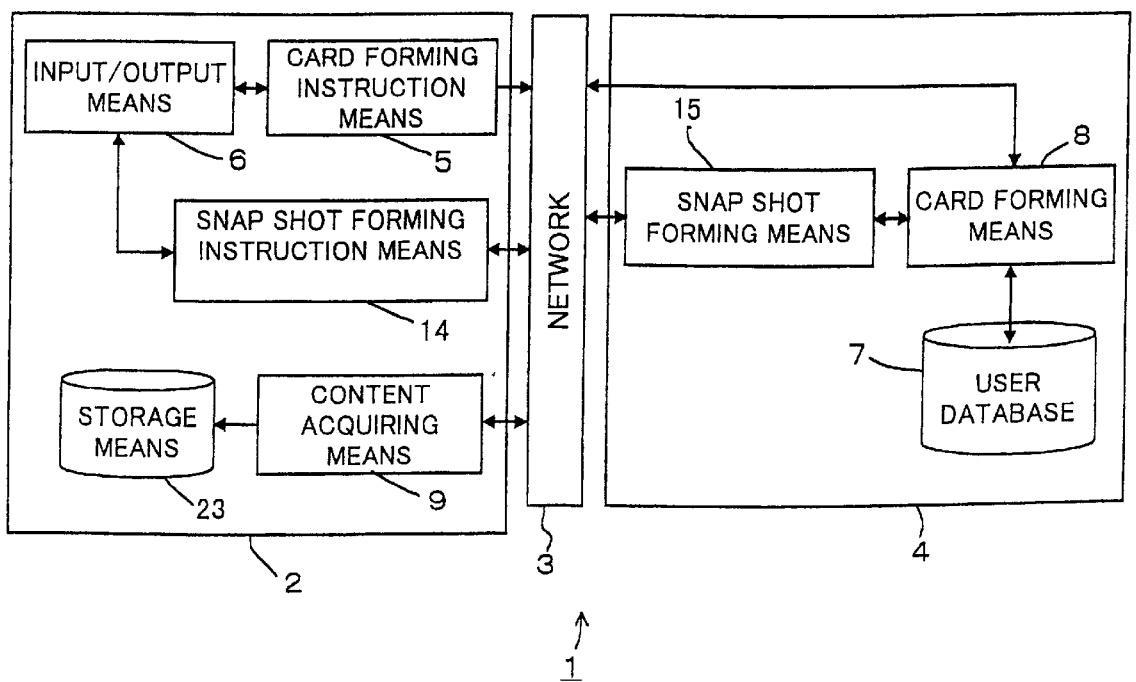
FIG. 6 is a block diagram showing yet another example of a group contact system which includes a snapshot forming means and a snapshot forming instruction means.

FIG. 6 shows an arrangement of another group contact system where the user terminal 2 further includes a snapshot forming instruction means 14, and the server 4 further includes a snapshot forming means 15 in the group contact system 1 of FIG. 2, or alternatively of the system in any of FIGS. 3, 4 or 5.

In the system depicted in FIG. 6, the user is provided with a means for entering, editing or changes a snapshot to be used in a group card. A snapshot (described in greater detail below) includes images and/or graphical symbols representing each of users that constitute a selected group. For instance, if the user has requested that a group card be formed, the user may select his or her favorite image or decide a position where the image will appear in the snapshot on the group card.

The snapshot forming instruction means 14 accepts an instruction (from a user) indicating a request to form a snapshot together with a group card forming instruction, and then transmits the received snapshot forming instruction and also the received group card forming instruction to the server 4. The snapshot forming instruction means 14 accepts selection by the user of a specific image or symbol, thereafter transmits a file containing the image or symbol to the server 4. The snapshot forming instruction means 14 also accepts a decision of a symbol and a change in a symbol contained in the snapshot transmitted from the server 4 for preview. Changes in a snapshot may include changes in the image file or symbol file, and changes in the positioning of the image and dimension thereof on the snapshot itself (as is described in greater detail below). Also, when a user makes a decision with respect to a snapshot or symbol, the decision is transmitted to the server 4. It should be understood that in the above described system, only the user terminal that originally transmitted the request to form a group card may transmit a snapshot decision notification.

The snapshot forming means 15 receives the snapshot forming instruction sent from the card forming means 8, and requests that the user terminals 2 corresponding to users in the selected group to transmit the image file or files to the server 4. When the image files are sent from the user terminal 2 in response to the request, the snapshot forming means 15 compiles and arranges the image files to form a snapshot. The snapshot forming means 15 simultaneously transmits the formed snapshot to each of the user terminals corresponding to the users in the selected group for preview. The snapshot forming means 15 then waits for a decision notification sent from the user terminals in the group and a symbol change notification sent from the user terminal 2 that originally sent the group card request.

When the symbol change notification is received, the snapshot forming means 15 updates the snapshot, and again transmits the updated snapshot to the respective user terminals 2 for preview. In the case that the snapshot decision notification is received, the snapshot is transmitted to the card forming means 8. Various methods are possible for the snapshot determining method. For instance, in an alternative configuration, the snapshot decision notification may be received from the user terminals of each of the users in the selected group, or, the server may be configured to wait a pre-selected time and if no notification has received, the snapshot may be automatically inserted into the group card.

Figure 7:
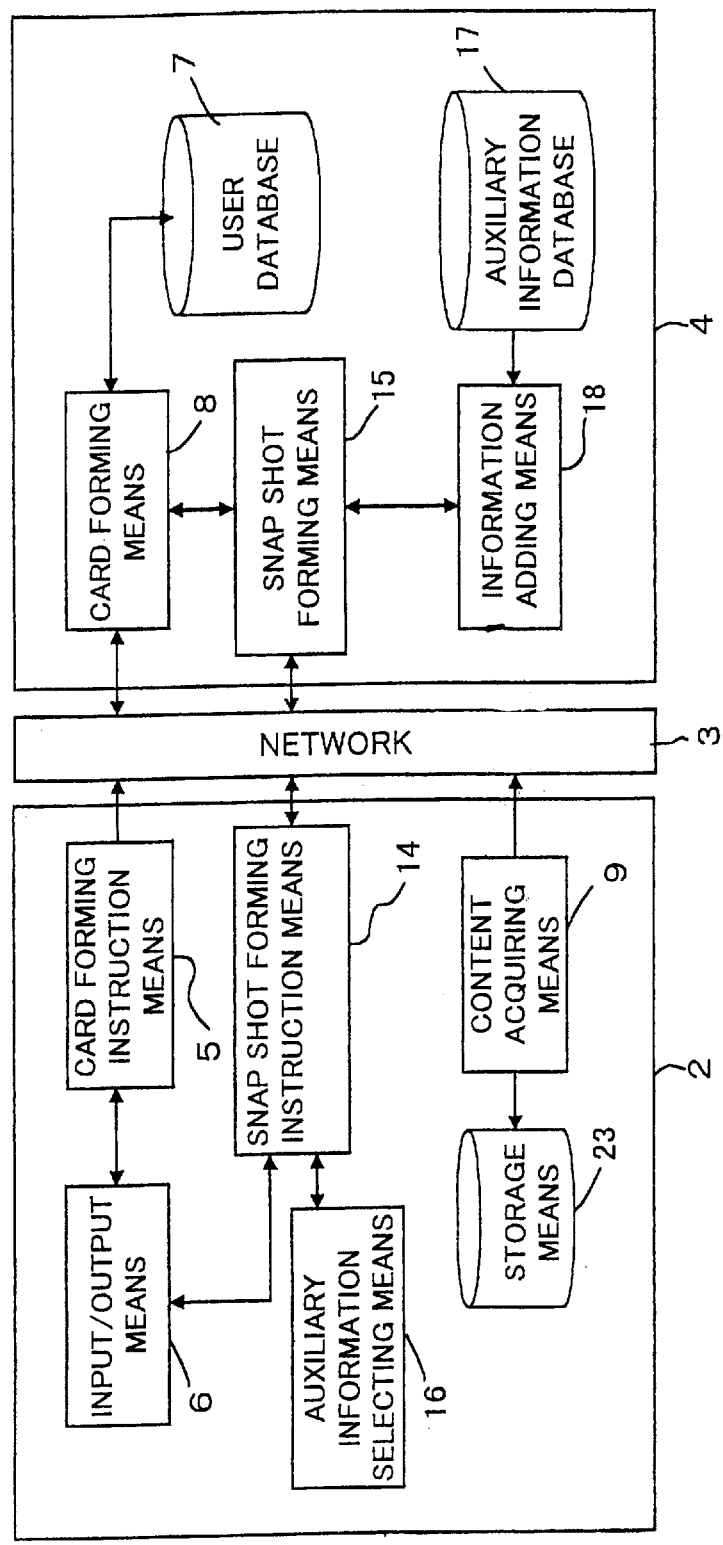
FIG. 7 is a block diagram showing an example of a group contact system which further includes an anxiliary information selecting means and an information adding means.

FIG. 7 shows an arrangement of another group contact system, namely, the user terminal 2 further includes an auxiliary information selecting means 16, and the server 4 further includes an auxiliary information DB 17 and an information adding means 18 in the group contact system 1 in addition to the features of the system depicted in FIG. 6.

The auxiliary information selecting means 16 accepts selection and changes in auxiliary visual information added to a snapshot made by a user and transmits the selected auxiliary information to the server 4 in a form of, for example, an identification number. The auxiliary information may be, for example, an ornamental frame added to a snapshot and/or image information relating to a background that may be inserted behind the images in the snapshot.

The auxiliary information DB 17 stores therein contents of the information defining the auxiliary information as applicable to a snapshot. For instance, the auxiliary information may be a specific background to be added to a snapshot. When the selected auxiliary information is selected from the user terminal 2 and the selection transmitted to the server 4, the information adding means 18 reads out the content of the auxiliary information from the auxiliary information DB 17. Furthermore, the information adding means 18 compiles the read auxiliary information with the snapshot formed by the snap-shot forming means 15, and then transmits the compiled snapshot to the user terminals 2 of the users who constitute the selected group for preview. Thereafter, similar to the above case, this information adding means 18 is brought into such a state that this information adding means 18 waits for a decision notification and a change notification sent from each of the user terminals.

Figure 8:
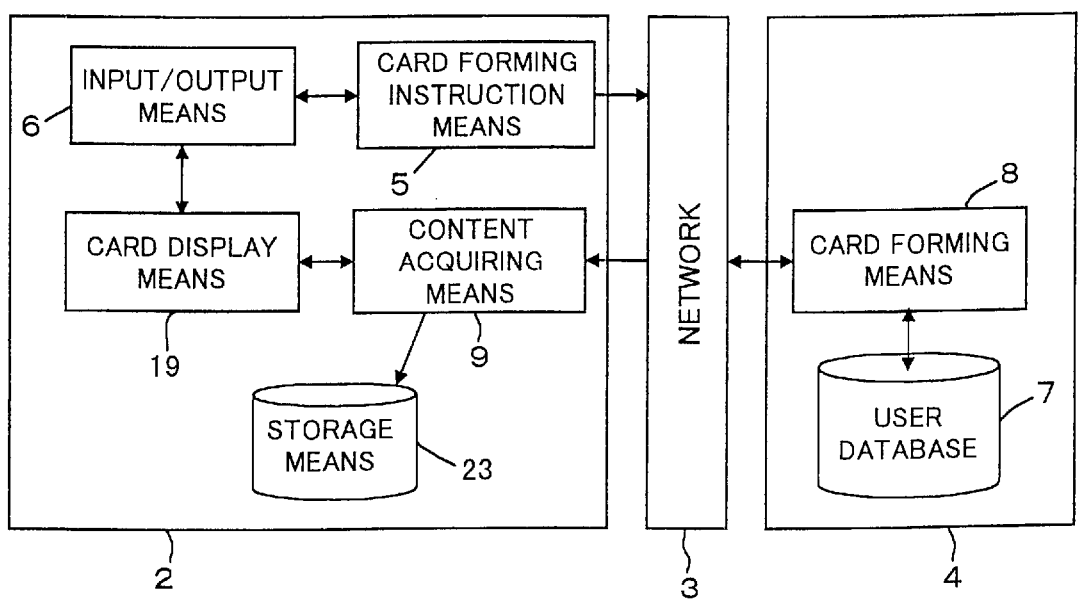
FIG. 8 is a block diagram showing an example of a group contact system which further includes a card display means.

FIG. 8 shows an arrangement of another aspect of the group contact system where the user terminal 2 further includes a card display means 19 in the group contact system 1 of FIG. 2. The card display means 19 displays the contents of a group card saved in the content acquiring means 9 on a monitor of the input/output means 6 screen of the user terminal.

In response to an acquisition completion notification issued from the content acquiring means 9 which has acquired the group card, for instance, the card display means 19 displays the content of the group card acquired by the content acquiring means 9 on a pre-selected region on the screen.

A first embodiment of the present invention is described below which includes the various features described above.

Figure 9:
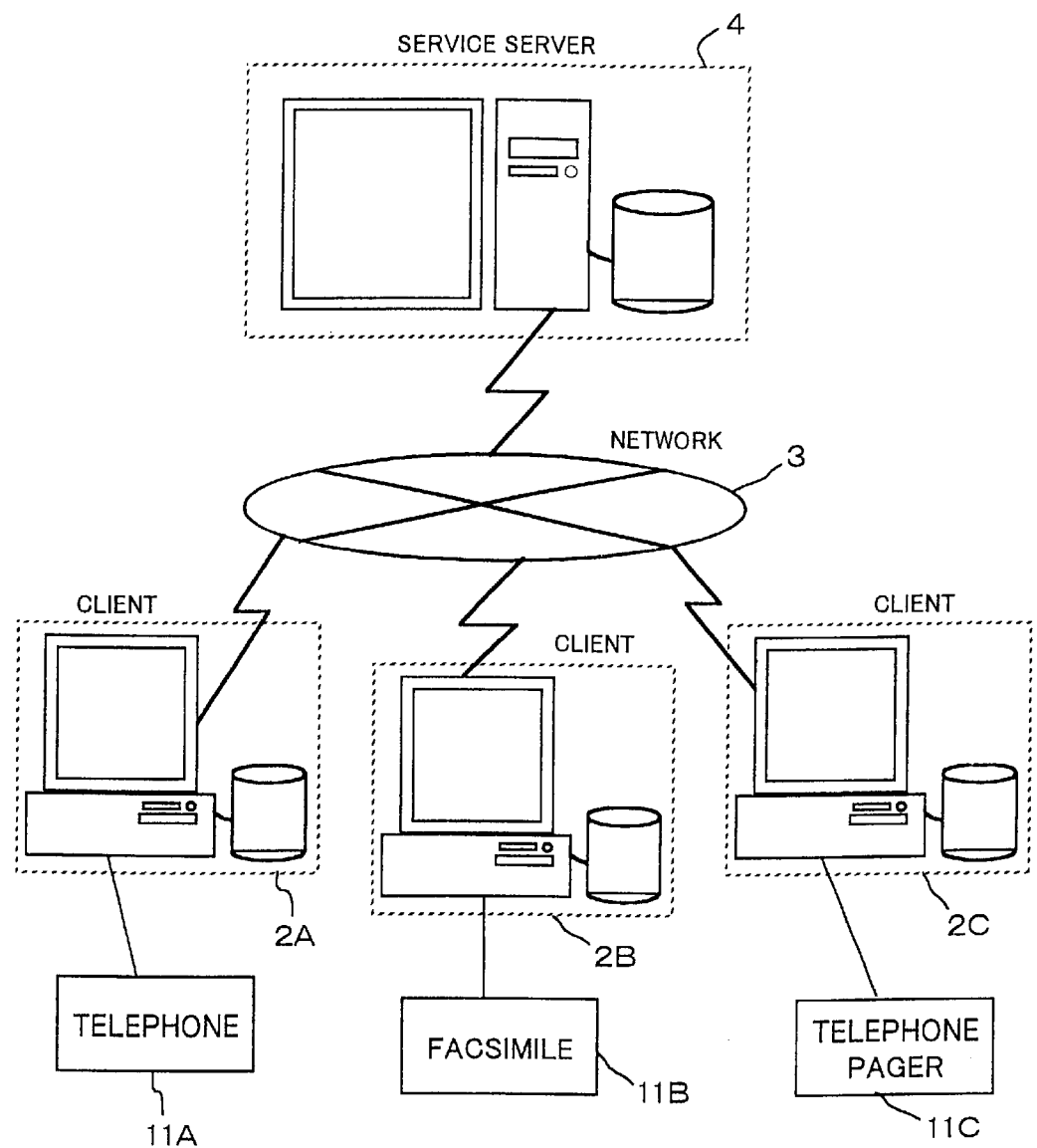
FIG. 9 is a diagram showing a group contact system in accordance with the present invention, the group contact system having a server and a plurality of user terminals or clients connected thereto via a network.

FIG. 9 schematically represents an arrangement of the group contact system 1 according to the first embodiment of the present invention. In FIG. 9, the group contact system 1 is arranged by user terminals 2A, 2B, 2C and a server 4 connected via a network 3 to these user terminals. A telephone 11A, a facsimile 11B, and a telephone pager 11C are external communication means connected to the user terminals 2A, 2B, and 2C.

Figure 10:
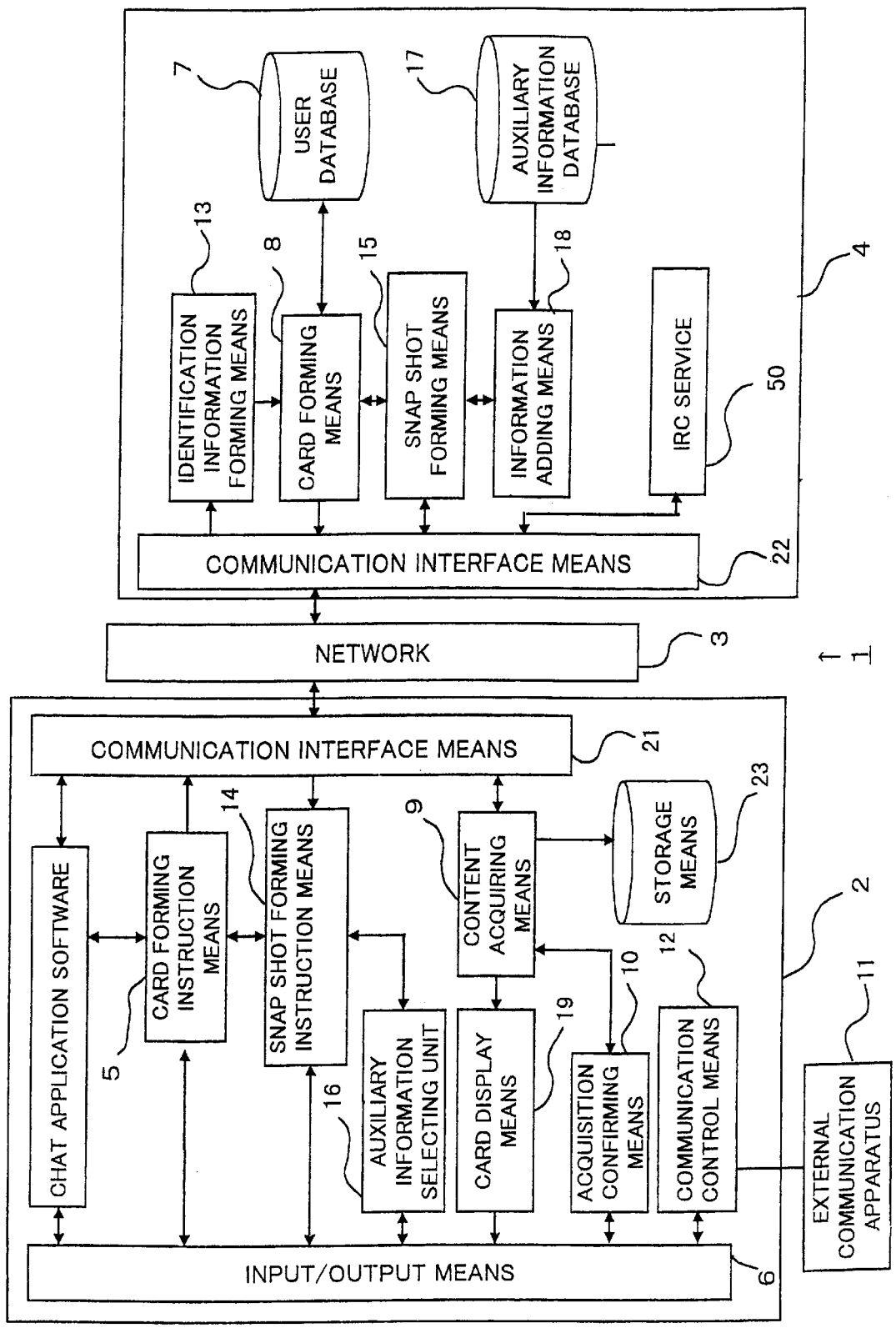
FIG. 10 is a block diagram showing an embodiment of the group contact system in accordance with the present invention.

FIG. 10 is a block diagram showing the various aspects one of the user information terminals 2A, 2B, 2C, and the server 4 indicated in FIG. 9. In addition to the above-explained functions, the user terminal 2 and the server 4 are equipped with communication interface means 21 and 22, respectively, connected to the network 3 so as to transmit/receive information. It should be noted that generally all of the aspects of the present invention described with respect to FIGS. 1–8 are combined in the block diagram FIG. 10. All of the aspects and features described above with respect to FIGS. 1–8 are included in the system depicted in FIG. 10.

It is now assumed that in the server 4, a server program is operated by which an Internet Relay Chat service (IRC) 50 is provided to the user terminal 2 via the network 3. Such an IRC service is a communication service which allows groups of users connected to a server to "chat" with one another, to become acquainted, and to exchange information and ideas. Also, each of the user terminals 2A, 2B, 2C includes chat application software that is operated so as to utilize the IRC service 50 provided in the server 4, thus enabling the respective users to have chats with each other. One such IRC service is described in co-pending and commonly assigned U.S. patent application Ser. No. 09/165,128 filed Oct. 2, 1998, which claims priority to Japanese Patent Application number 10-91431, filed Apr. 3, 1998. U.S. patent application Ser. No. 09/165,128 filed Oct. 2, 1998 is in incorporated herein by reference in its entirety.

Now, an explanation of the operations of the present invention is provided with respect to flowcharts and screen displays as they appear on a user terminal.

Figure 11:
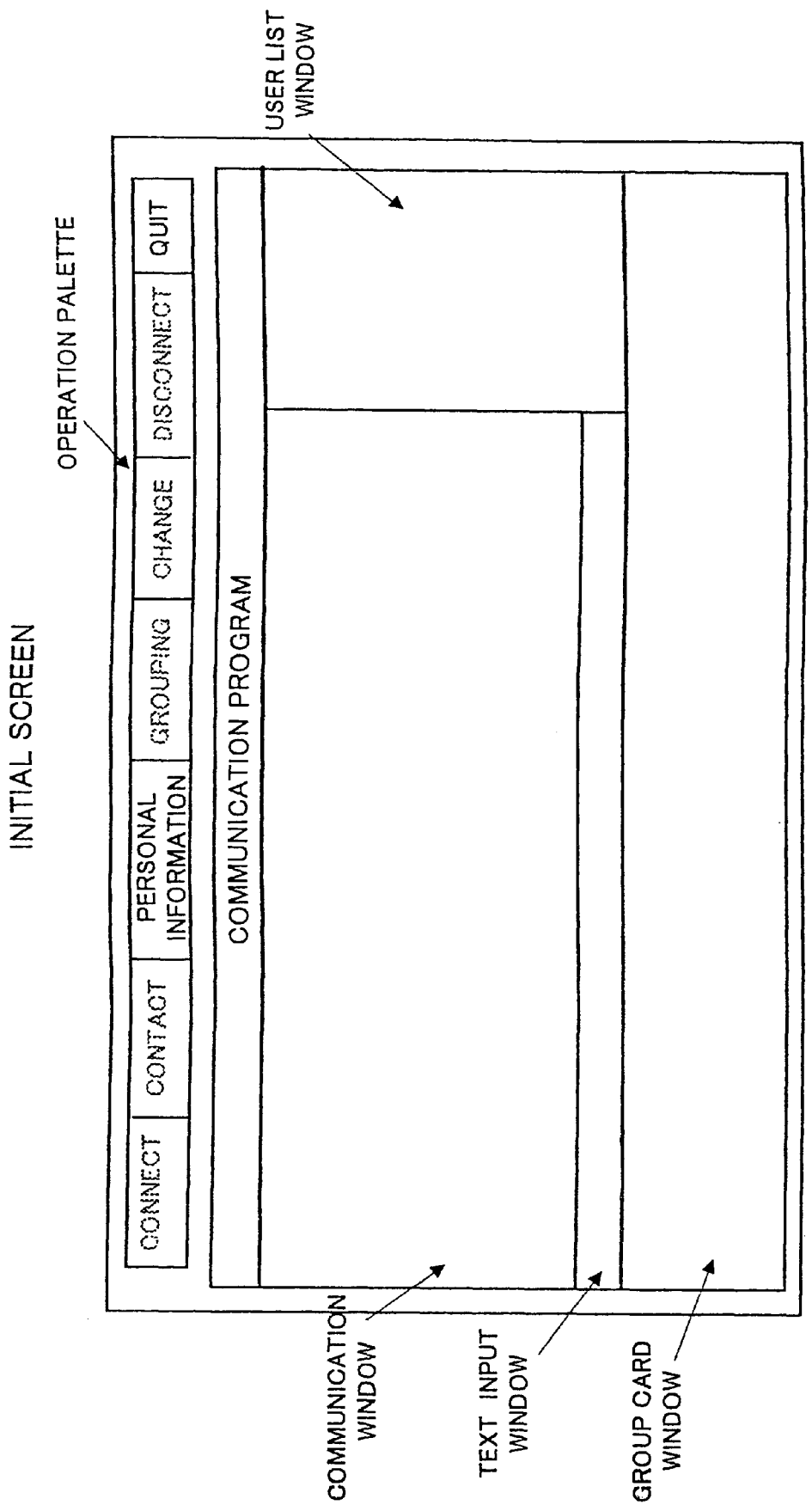
FIG. 11 is a diagram showing an example screen display as viewed from a user terminal immediately after contact application software in a user terminal has been activated.

FIG. 11 shows an example of a display on the user terminal 2 showing the chat application software just after being started. As can be seen in FIG. 11, there are several section on the window display, such as "Operation Palette", "Communication Window", "Text Input Window", "User List Window", and "Group Card Window" are displayed on this screen.

A user selects a desirable process from the "Operation Palette". The "Operation Palette" includes visual buttons representing various functions such as "connect", "contact", "personal information", "grouping", "change", "disconnect", and "quit".

The "connect" button when clicked on using, for instance, a mouse of the input/output means 6 in FIG. 10, engages a function to connect the user terminal 2 via the network 3 to the server 4. It should be noted that the "connect" button is indicated in gray shading and can only be depressed after the user information is registered into the server 4 by using the "personal information" function (discussed below).

The "contact" button represents a function whereby a user is contacted. The user is first selected from a group corresponding to a group defined in a group list of a selected group card (formed by using a grouping function, as discussed below). A communication is established with the selected user of the selected group by using the external communication means 11 (described above). In the case where no group card has been selected, the "contact" button is displayed with a grey shading, and therefore cannot be depressed.

The "personal information" button represents a function used to register user information into the server 4. The access levels may be set to the server 4, and these access levels may determine as to whether the respective items of the user information correspond to operable information, or secret information.

Figure 12:
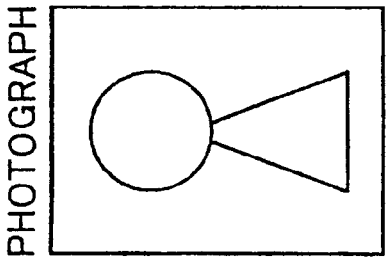
FIG. 12 is a diagram showing an example of a screen display as viewed from a user terminal, where the screen display shows a user information window.

Once the "personal information" button has been pushed, the display shown in FIG. 12 appears on the screen of the input/output 6. The display in FIG. 12 is an example of "personal information window" used to register, or change the user information. The registering process of user information and a changing process of the user information is discussed below.

The "grouping" button represents a function whereby at least one of other users who are presently chatting with the present user through the same IRC channel may be designated as one of the users in a group, and a group card may subsequently be formed. The "grouping" button is indicated in a grey color when the user terminal 2 is not connected to the server 4, and therefore cannot be depressed until the user terminal 2 is logged onto the server 4.

The "change" button represents a function whereby a formed group card may be changed or edited. The "change" button is indicated in a grey color when no group card has been formed, and therefore cannot be depressed.

The "disconnect" button represents a function whereby the connection with the server 4 is to be terminated. The "disconnect" button is indicated in a grey color when the user terminals 2 is not connected to the server 4, and thus cannot be depressed until a connection is established.

The "quit" button represents a function whereby contact with the group contact program (the chat application software or IRC program) is to be terminated. It should be noted that the above-explained functions are the preferred functions but that other functions and operation palettes are possible.

As mentioned above, when the "personal information" button of the operation palette is clicked for entry or changes of user information, the "personal information window" used to enter the user information shown in FIG. 12 is displayed. As indicated in FIG. 12, access levels corresponding to each of the respective items of user information may be entered. For example, when an access level is set to "high", the corresponding information item available to all users. When the access level is set to "medium", the corresponding information item may only be accessed by a close friend. When the access level is set to "low", the corresponding information item may not be accessed by any users. Only the user who is or has entered such information may access an item designated as "low" access. Therefore, privacy can be protected.

In this embodiment, the inputs of the user information other than "nickname" are arbitrary, and therefore, no restriction is made in the user information entries. However, if "nickname" is not entered, then the personal information cannot be defined. Everyone can see the access level of "nickname", and cannot select the access level other than "high".

Also, an image file such as a photograph may be designated as part of the user information. The image file is selectable by depressing a "symbol file selection" button to designate a file name. A preview of the image file may also be performed. The image file is arbitrary information that is available to any other user and therefore, in a manner similar to the information "nickname", has an automatic access level of "high". As other user information, various personal information may be provided, such as a self-introducing text.

After the user information has been registered, when the "personal information" of the operation panel is clicked, this user information may be changed at any time. When the user information is changed, the previously entered attribute values in "personal information window" indicated in FIG. 12 are displayed in the respective fields.

When the user information is entered to be once defined, the grey indication of the "connect" button on the operation panel indicated in FIG. 11 is released, so that the user terminal can be connected to the server 4. After being connected to the server 4, either the newly formed user information or the changed user information is automatically transmitted to the server 4.

Figure 13:
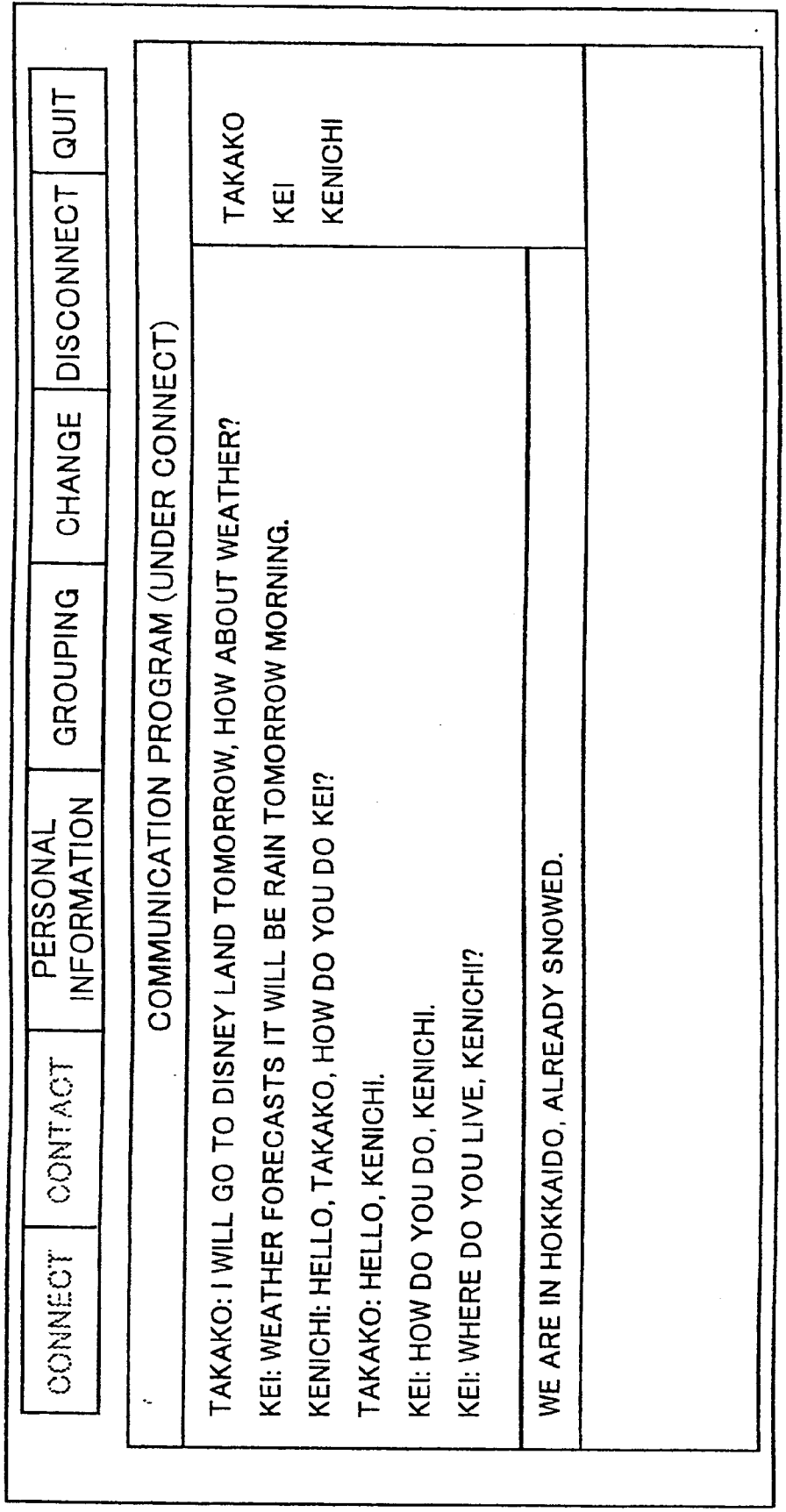
FIG. 13 is a diagram showing an example of a screen display as viewed from a user terminal, where the screen display shows contact application software with a communication established and in progress.

As indicated in FIG. 13, when the connection of the user terminal to the server 4 is established, the grey indications of the "grouping" button, the "change" button, and "disconnect" button on the operation panel are released, whereas the "connect" button and the "contact" button are indicated in grey colors. Furthermore, in "communication window", "text input window", and "user list window", indications are made reflecting activity in association with the chat application software.

Text entered from each of users who participate in a chat established after the respective user terminals are connected to the server 4 are displayed on "communication window".

Similar to the normal chat, there are some cases where at the time text is entered, the nickname of the user entering the text may be added at the left of the added text, as shown in FIG. 13.

Similar to the normal chat application software, the "text input window" is designated for entering characters making up a text from the user. After the characters have been entered into the text input window, a "return" key of the keyboard of the input/output means 6 is depressed and the text characters are transmitted to the chat application software (IRC Service 50), and then transmitted to the respective user terminals engaged in the channel. The transmitted text characters are displayed on the "communication window" of the respective user terminals, or displayed on the screen by the chat application software.

Names of users who participate in a channel are indicated on "user list window". In the "user list window", the name of the present user (whose display is shown in FIG. 13) is also displayed. The name of the present user may be either the nickname or the user's true name. The server 4 can recognize the true name and other information from the user DB 7.

Figure 16:
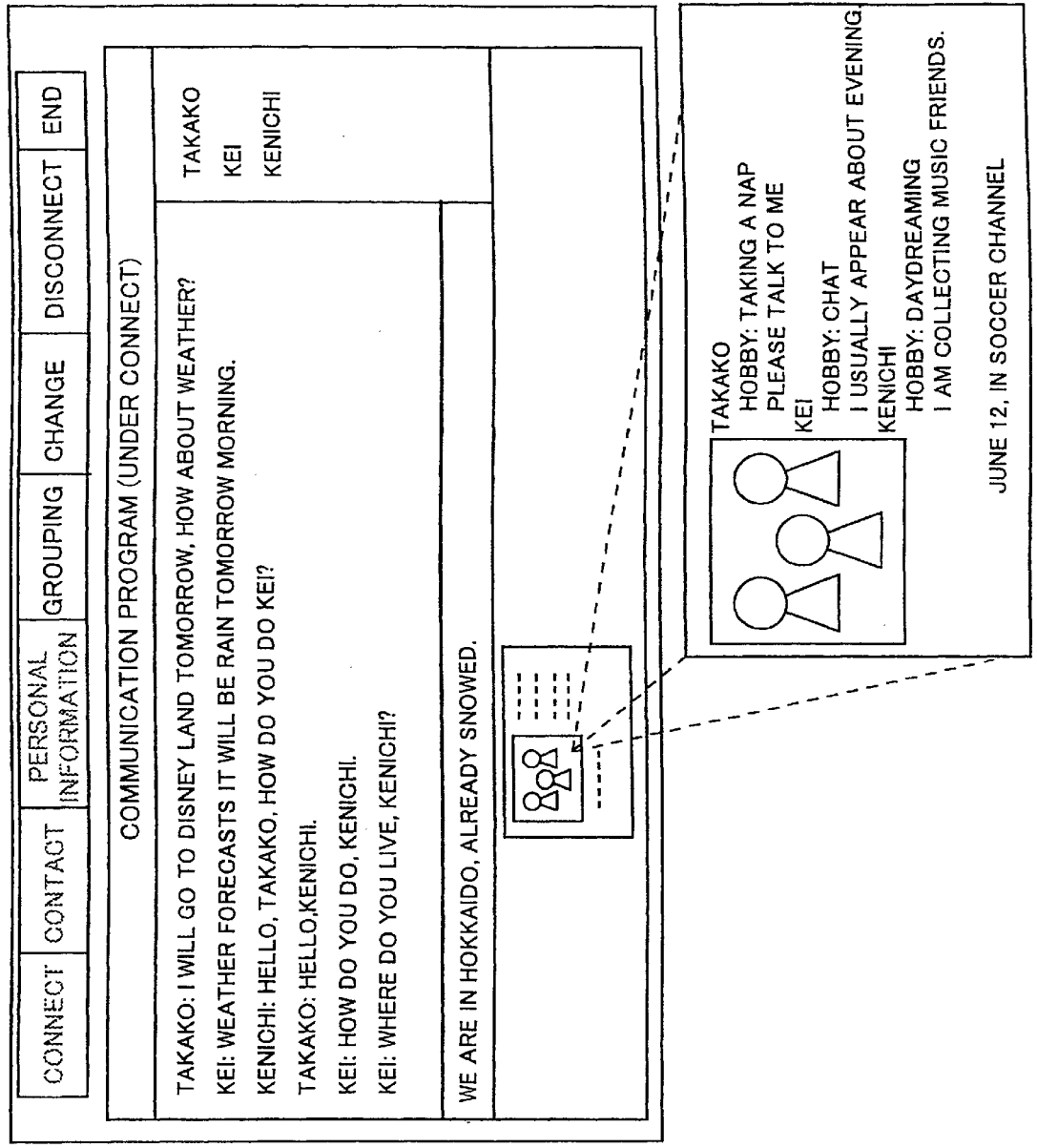
FIG. 16 is a diagram showing an example of a screen display as viewed from a user terminal, where the screen display shows conditions after a group card is formed.

In the "group card window", if a group has been identified by the present user, designated information is displayed corresponding to a calling card or "group card". FIG. 16 represents an example of an acquired group card in the "group card window" (as is described below). A plurality of group card may be displayed in the "group card window". Alternatively, the group card may be displayed at any position on the screen, and may be rearranged in accordance with a pre-defined rule, such as by date, name, size, etc.

Forming of a group card can be accomplished by depressing the "grouping" button in a screen in which a conversation or chat is occurring, for instance, as shown in FIG. 13. When the "grouping" button is clicked, a "grouping window" is displayed, as shown in FIG. 14.

Figure 14:
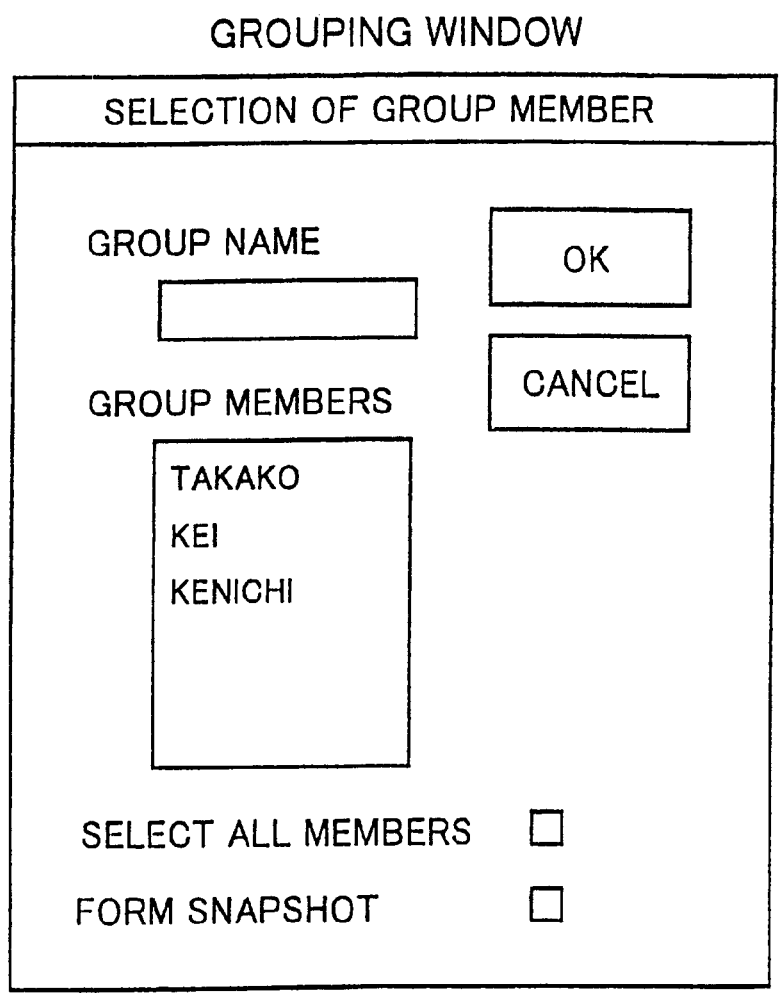
FIG. 14 is a diagram showing an example of a screen display as viewed from a user terminal, where the screen display shows a grouping window for entering users who make up a group of users.

In the "grouping window" of FIG. 14, a name such as a "musicians" may be entered with respect to a forming group in a "group name" field. The group name may be freely changed even after the group card is formed. In a "group member " list, the same user names as the name lists indicated in "user list window" (see FIG. 11 and FIG. 13) are displayed. One or more of the users in the "user list window" may be selected for designation in the group. When a check is entered into the box of "all members are selected" located under the user list, all of the users listed in the user list are selected. Alternatively, one user only to be in the group card is selected from the user list window of FIG. 13. Thereafter, the "OK" button is depressed and the group card containing the selected user may be formed.

When a box marked "form snapshot" is checked, a snapshot is formed for inclusion in a subsequently formed group card. The snapshot is described in greater detail below.

In the case where the group name is entered, the group member or members are selected, and then the "OK" button is clicked, a group card forming request containing the description of the selected group member is transmitted to the server 4, so that the group card is formed. When the check box of "form snapshot" is checked, a snapshot forming request is also transmitted. As exemplified in FIG. 16, the formed group card is displayed in "group card window". The nicknames and hobbies of the group members, and comments and symbol information thereof are indicated in the group card. Apparently, a telephone number and a mail address may be displayed.

Formation of a snapshot is described below.

In the case where a group card is to be formed, a check must be inserted into the box of "form snapshot" in the "grouping window" shown in FIG. 14. Thereafter, the "OK" button is depressed. A "snapshot window" is used to select an image file and a frame, as is indicated in FIG. 15.

Figure 15:
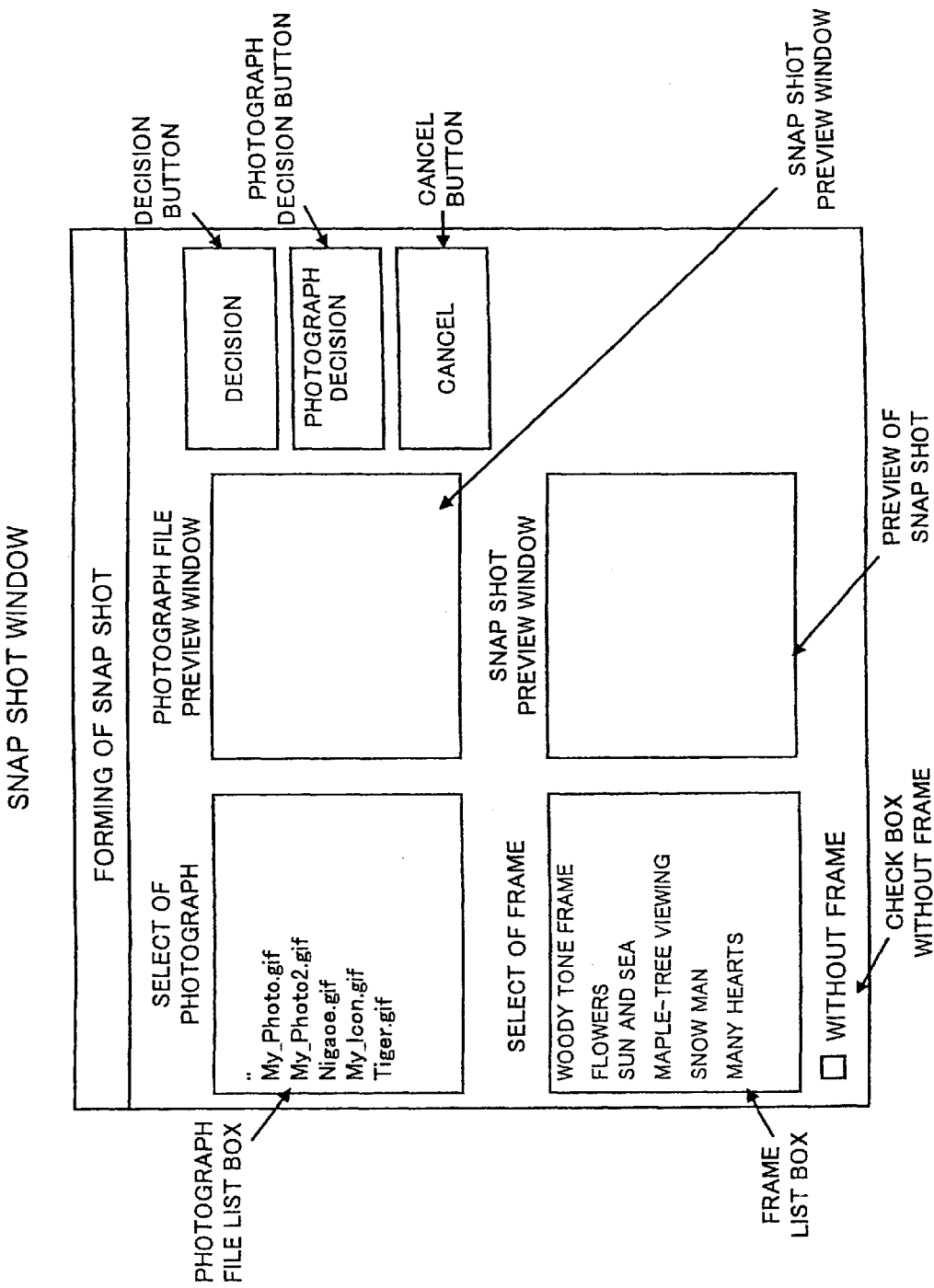
FIG. 15 is a diagram showing an example of a screen display as viewed from a user terminal, where the screen display shows an example of a snapshot window.

In the "snapshot window" of FIG. 15, a photograph, a portrait, an icon, symbol, or other image files, which indicates a symbol to represent a user, is displayed in "photograph file list box". Also, if an image file is located in a different folder or directory (on a local hard drive, for instance) such a file can be selected from the "snapshot window". Since the content of the selected photograph file or image file is displayed on "photograph file preview window", the user can readily confirm the file contents. An image file or photograph file is selected by the user. Thereafter, a "photograph decision" button (FIG. 15) must be depressed after the photograph file has been selected and the photograph file is transmitted as the selected symbol to the server 4.

A list of decoration frames is displayed in "frame list box" and may be utilized as a frame and a background of a photograph file of a user. If a check is put into the box adjacent to the words "without frame", the decoration frame may not be used.

In the "snapshot preview window", a snapshot is displayed which contains a photograph file and a decoration frame, which are determined by the present user to represent the present user. Although the type and position of the decoration frame is fixed, the size of the photograph of the user and the display position thereof displayed within the frame can be changed in real time on the preview screen. As previously explained, after the snapshot is formed on the "snapshot preview window", the snapshot decision notification is transmitted to the server 4 by depressing the "decision" button. The server 4 considers the snapshot to be a symbol of the group in accordance with the snapshot decision notification.

When a group card displayed in the "grouping window" of FIG. 16 is selected and then a "contact" button of the operation panel is depressed, a "Contact window" shown in FIG. 17 is displayed. The "contact window" is a window used to set a communication means among group members based upon information opened by these group members.

In the example of FIG. 17, two persons of "TAKAKO" and "Kei" other than the present user "KENICHI" are of the group making up the selected group card. The contact information of each user is displayed in accordance with the access level set by each respective user. "TAKAKO" discloses her electronic mail address and her telephone number of pager, but does not disclose her telephone number and her facsimile number. On the other hand, "Kei" discloses his electronic mail address and her telephone number, but does not disclose his telephone number of pager.

Since a check box located beside the contact means is checked, a contact means for each person can be designated. In the case where there is no check mark present for any of the group users, the contact button is indicated in a grey color, and therefore cannot be depressed.

A "transmission text" window located on the right side of the "contact window" is a window used to send brief information to each user when text transmission system media (electronic mail, facsimile, telephone pager, etc.) are selected. Since a telephone cannot transmit such data, a telephone number cannot be used to send a document.

When the "OK" button (FIG. 17) is depressed after the contact party and the contact means are selected, a communication is commenced with employment of the selected external communication means.

Figure 18:
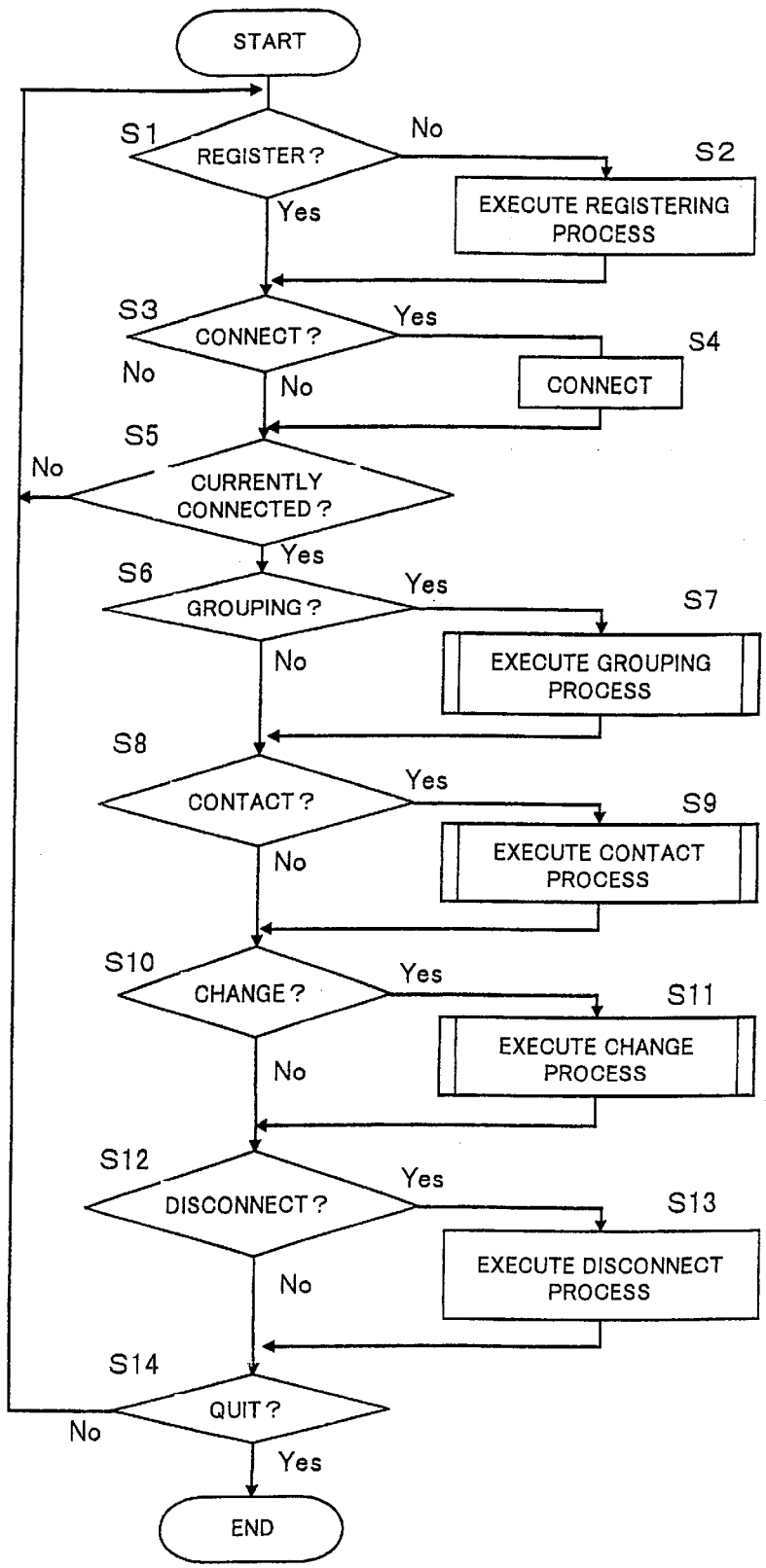
FIG. 18 is a flow chart showing steps in a main process operation executed by the user terminal.

FIG. 18 is a flow chart for describing a main process flow operation executed in the user terminal 2.

First, the application software is initiated, at step S1, a check is made as to whether or not the user information has already been registered into the server 4. If the user information has not yet been registered, then the main process operation is advanced to a registering process operation defined at step S2. Also, when the "personal information" button is depressed in order to change the previously registered user information, this main process operation is advanced to this step S2. Conversely, if the user information has been registered, then the process operation is brought into such a waiting condition that any of the process operations of the above-described operation palette is selected, and then the process operation is advanced to a step S3.

At step S2, the "personal information window" as shown in FIG. 12 is opened, and then the user information is entered together with the access levels of the respective items. Also, an image file such as a photograph of the user and other image information may also be entered at this time. When the input operation is accomplished and then the definition button is depressed, the process operation is advanced to step S3.

At this step S3, a determination is made as to whether or not the connecting process has been selected. The selection is made when a user presses the "connect" button depicted in FIG. 11 or 13. When it is determined that the connection process has been selected (yes), the process operation is advanced to step S4 where a connection attempted. In other words, when the "connect" button is depressed, if the user terminal 2 is connected to the network 3, the connection between the user terminal 2 and the server 4 commences in step S4. In step S4, the user enters the user name and the password in response to the request issued from the server. Conversely, when the user terminal 2 has not depressed the "connect" button, the process operation advances from step S3 directly to step S5.

In step S5, a determination is made whether or not a connection is currently established between the user terminal 2 and the server 4. If no connection is currently established, operation returns to step S1. If a connection has been established, the process operation advances to step S6.

At step S6, a check is made as to whether or not the selected process is the grouping process. When it is determined that the grouping process has been selected, the process operation is advanced to a grouping process defined at step S7. When other processes are selected, the main process operation is advanced to step S8.

The grouping process defined at step S7 is described in detail below with respect to FIG. 20.

At step S8, another determination is made as to whether or not the selected process operation is the contact process. When it is so determined that the contact process is selected, the main process operation is advanced to step S9. When other cases are selected, the main process operation is advanced to step S10.

Figure 22:
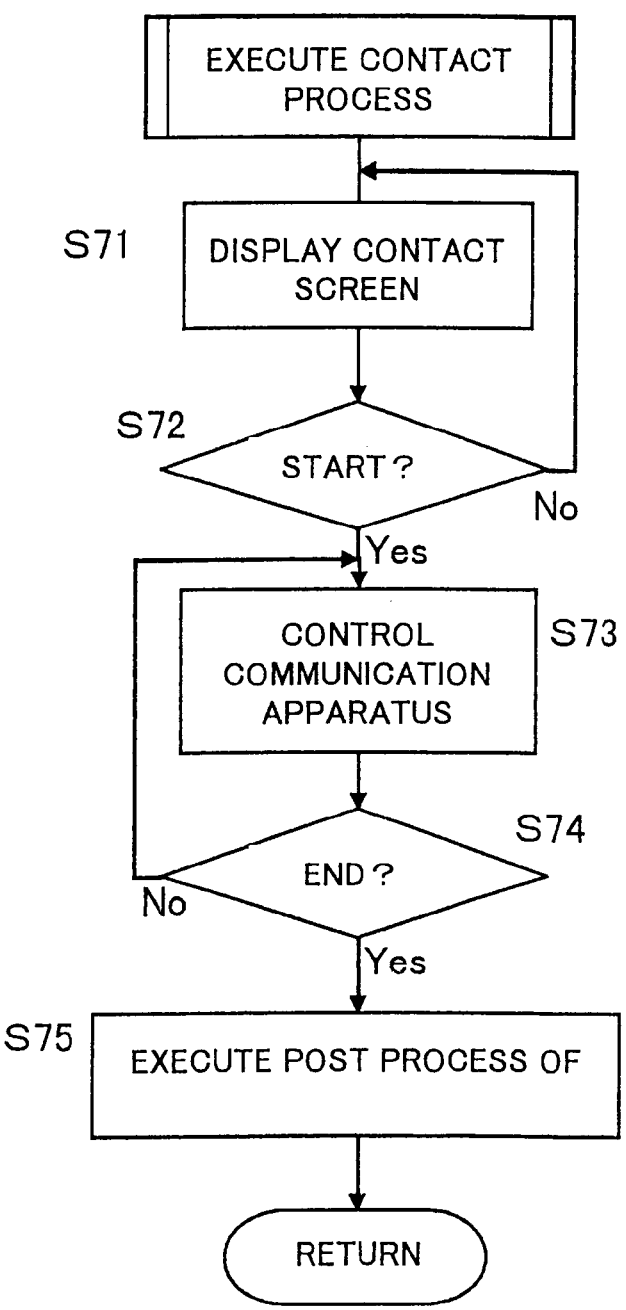
FIG. 22 is a flow chart showing steps in a contact process operation executed by the user terminal.

The contact process defined at step S9 is described further below with respect to FIG. 22.

At step S10, another determination is made as to whether or not the selected process operation is to change the contents of a group card. When it is so determined that the group card changing process is selected, the main process operation is advanced to the changing process at step S11.

When other cases are selected, the main process operation is advanced to step S12.

Figure 23:
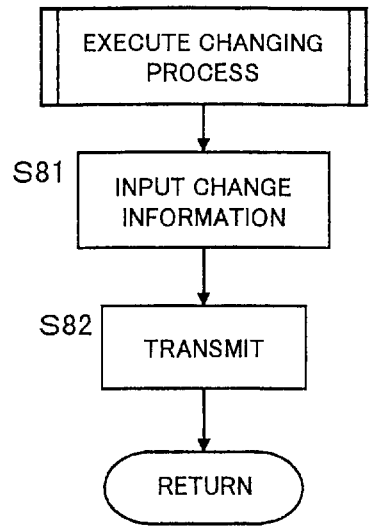
FIG. 23 is a flow chart showing steps in a group card changing process operation executed by the user terminal.

The group card changing process defined at step S11 is described in greater detail below with respect to FIG. 23.

At step S12, another determination is made as to whether or not the selected process operation is a disconnecting process. When it is so determined that the disconnecting process has been selected, the main process operation is advanced to step S13. When other cases are selected, the main process operation is advanced to step S14.

At step S13, a process operation to disconnect the connection between the user terminal 2 and the server 4 is carried out. Then the main process operation is advanced to step S14. At this step S14, a check is made as to whether or not the selected process operation is the end process. When it is so determined that the end process is selected, this main process program is ended. When other cases are selected, the main process operation is returned to the previous step S1. Then, the process operations are repeated.

Figure 19:
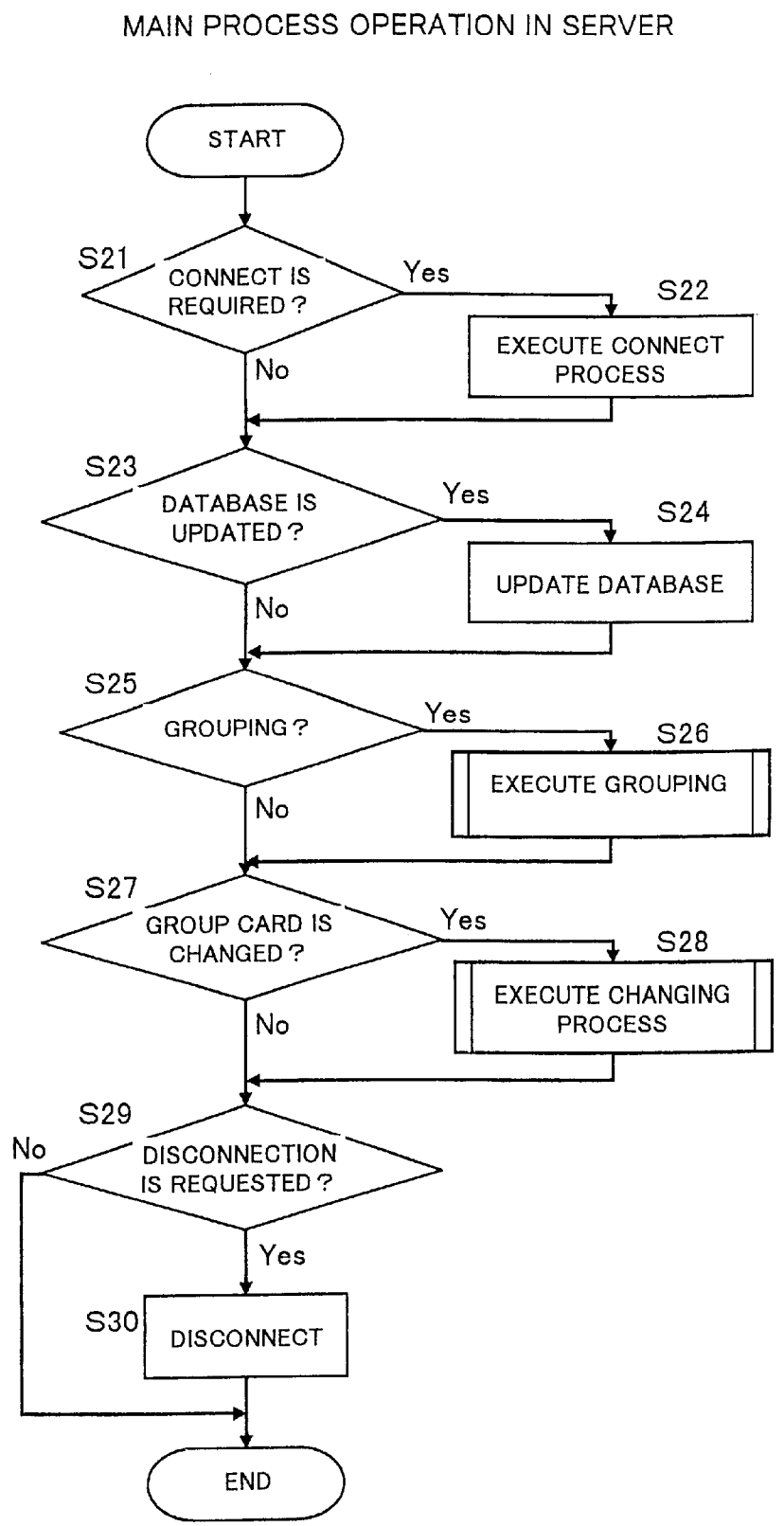
FIG. 19 is a flow chart showing steps in a main process operation executed by the server.

FIG. 19 is a flow chart for describing a main process operation executed in the server 4 in the case that the user terminal 2 executes the above-explained main process operation. This main process operation is started when requests issued from the user terminal 2 are received.

At step S21, a check is done as to whether or not the requested process is equal to the connect process operation. If the connect process operation is requested, then the main process operation by the server 4 is advanced to step S22 at which the connect process is executed. When other process operations are requested, this main process operation is advanced to further step S23.

At above step S22, the server 4 requests the user terminal from which request has been received to enter a password and user ID, and allows the connect process. In the server 4, the user information with respect to the user IDs is managed in a table. Every time the user is connected to the server 4, the user information used to specify the user is written into the table, and is saved until the user accomplishes the service. The server 4 utilizes this table to access the user information of the respective users.

At step S23, a determination is made as to whether or not the requested process corresponds to either the registering request of user information or the changing request of user information. When it is so determined that either the registering request or the changing request is made, the main process operation is advanced to step S24. When it is so determined that other request processes are made, the main process operation is advanced to step S25.

At this step S24, the user information sent from the user terminal 2 is stored into the user DB 7, and then the main process operation is advanced to the above step S25.

At step S25, a determination is made as to whether or not the requested process corresponds to the grouping request process. When it is so determined that the grouping request process is made, the main process operation is advanced to step S26. When it is so determined that other request processes are made, the main process operation is advanced to step S27. The grouping process defined at step S26 is described in greater detail below with respect to FIG. 21.

At step S27, a determination is made as to whether or not the requested process is equal to the changing request of the group card. When it is so determined that the group card changing request is issued, the main process operation is advanced to a changing process defined at step S28. When other process requests are issued, the main process operation is advanced to step S29. The changing process of the above step S28 is described below in greater detail with respect to FIG. 24.

At step S29, a determination is made as to whether or not the requested process is equal to the disconnect request of the connection to the server 4. When it is determined that the disconnect request has issued, the main process operation is advanced to step S30. At this step S30, the connection with this user terminal is disconnected, and then the main process operation is returned to the previous step S1. When other requests are issued, the main process operation is finished. When the user terminal 2 sends a request to the server 4, the process starts again.

Figure 20:
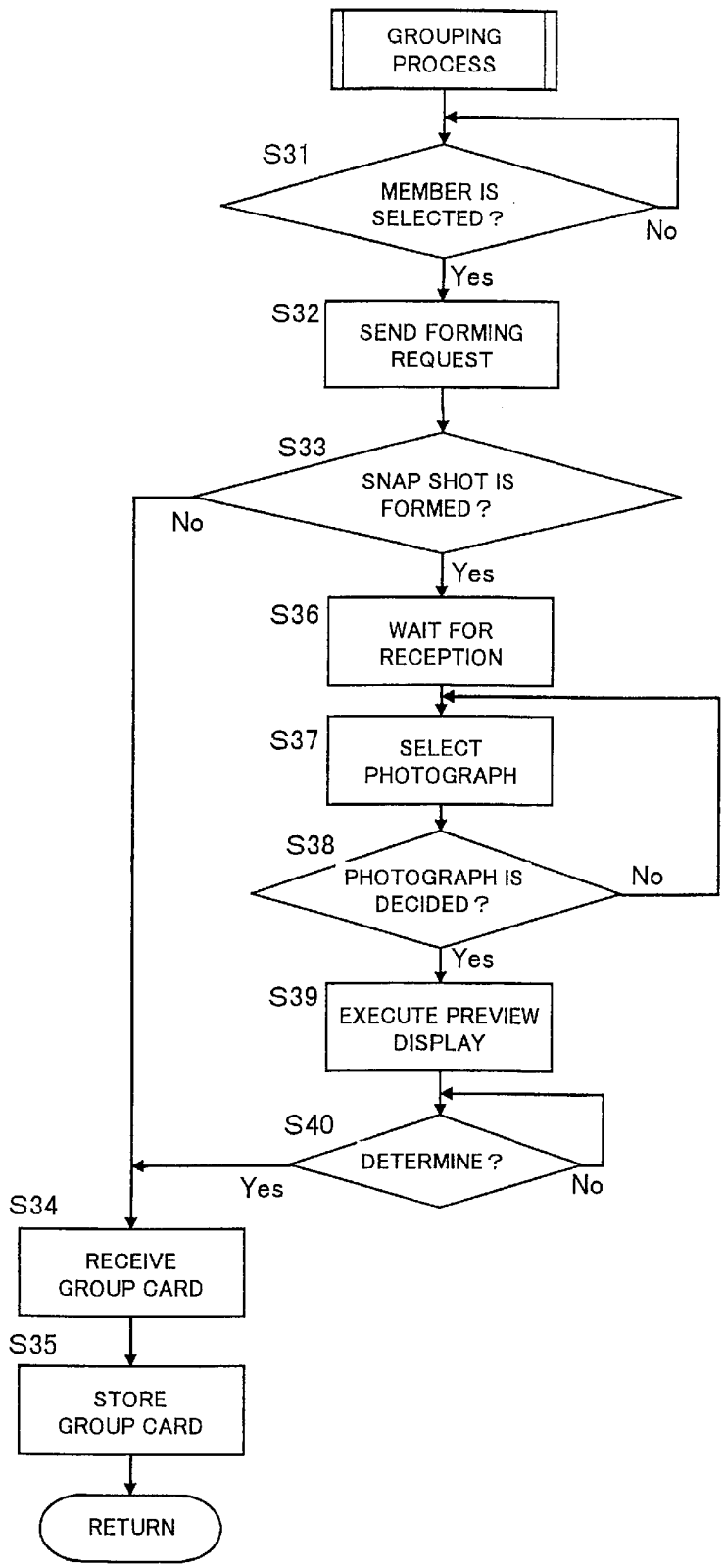
FIG. 20 is a flow chart showing steps in a grouping process operation executed by the user terminal.

FIG. 20 is a flow chart for describing the "grouping" process operation executed in the user terminal 2. At step S5 of the above-explained main process operation, when the grouping process is selected, the main process operation is advanced to a further step S6 at which the below-mentioned process operation is commenced. Referring now to the above-described "grouping window" shown in FIG. 14, process operations will be explained as follows.

First, at step S31, a determination is made as to whether or not the group member is selected from the group member list. If the group member is selected, then the process operation is advanced to step S32. Conversely, if the group member is not selected, then the process operation is brought into a waiting state until the group member is selected.

At step S32, since the "decision" button is depressed, a group card forming request is sent to the server 4 together with the group member list on which the selected group member and the nickname of the own member are described.

At step S33, another check is done as to whether or not a snapshot forming request is transmitted together with the card forming request. If the snapshot forming request is not sent, then the main process operation is advanced to step S34. Conversely, if the snapshot forming request is sent, then the main process operation is advanced to step S36.

At the step S34, a group card forming notification and a group card ID are received from the server 4, and then a group card transmit request is issued by the user terminal 2.

At step S35, the group card sent from the server is acquired by the content acquiring means 9 to be stored into the storage means 23.

When it is so judged at the above step S33 that the snapshot forming request is transmitted, the main process operation is advanced to step S36.

At step S36, the main process operation waits that the symbol file request is sent from the server 4 in response to the snapshot forming request.

At step S37, upon receipt of the symbol file request, the above-described "snapshot window" (see FIG. 15) is displayed, and the main process operation waits that the symbol file is selected, and changed by the user.

Furthermore, at step S37, the user terminal accepts a selection of a decoration frame from the "frame list box" by the user. When the "check box without frame" is checked, it is preferably designed that no selection can be made of the frame in the frame list box.

At the S38, a check is done as to whether or not the "photograph decision" button is depressed. If this button is not depressed, then the main process operation is returned to the photograph selecting step defined at the previous step S37. Conversely, when this button is depressed, both the symbol file selected by the user and the selected frame ID are transmitted to the server 4.

At step S39, such a snapshot synthesized by the server 4 with employment of the symbol files and the decoration frames sent from the respective user terminals is displayed on the "snapshot preview window".

At step S40, another determination is made as to whether or not the "decision" button is depressed on the "snapshot window". If this button is not yet depressed, then the determination is again repeated, and the main process operation waits that the "decision" button is depressed. Conversely, when the "decision" button is depressed, the preview decision notification is transmitted to the server 4. Then, the main process operation is advanced to step S34.

It should be understood that in this embodiment, only the user who issued the group card forming request depresses the "decision" button. Alternatively, when any one of the group members depress this decision button, the snapshot may be determined.

Figure 21:
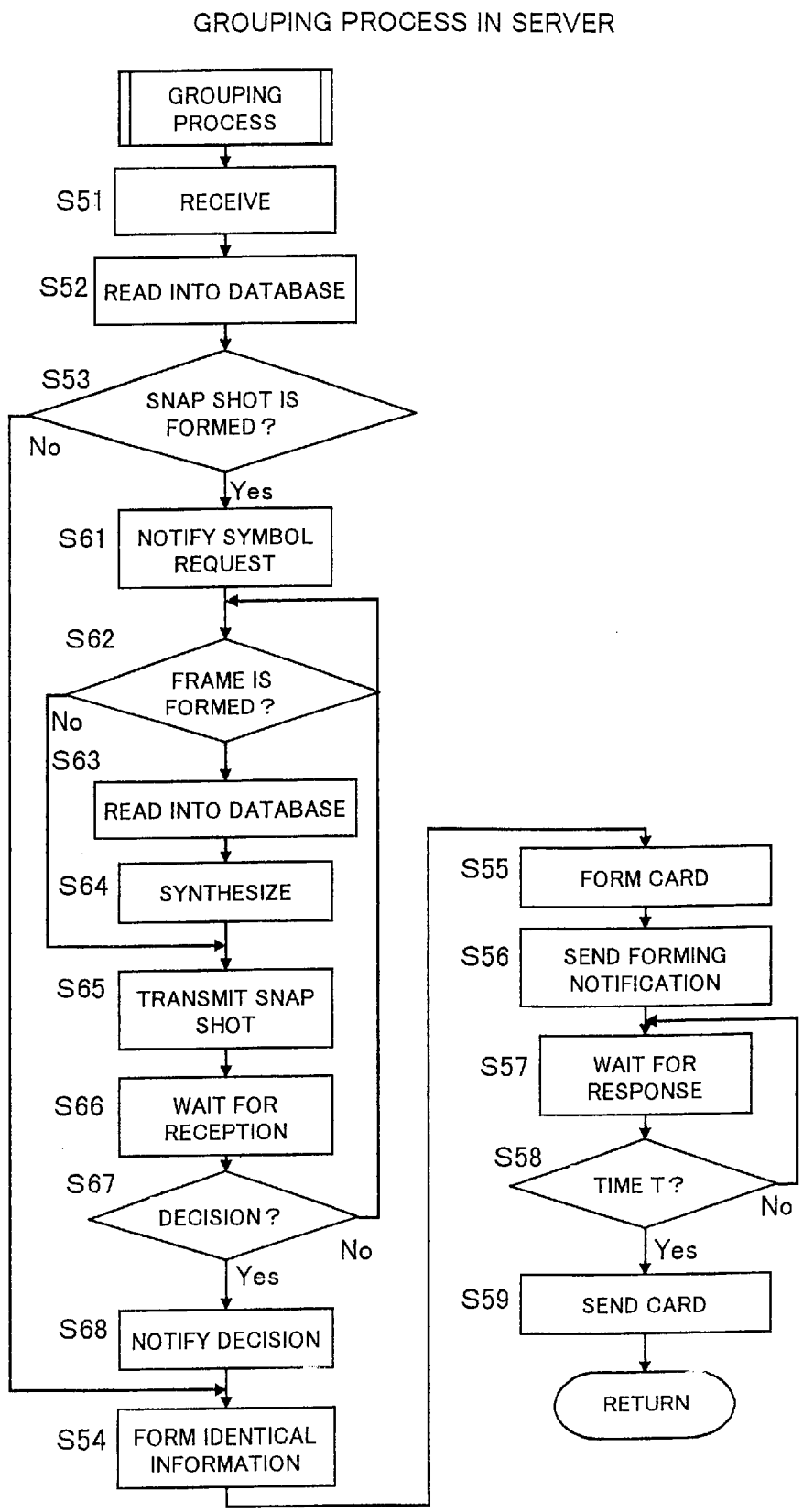
FIG. 21 is a flow chart showing steps in a grouping process operation executed by the server.

FIG. 21 is a flow chart for describing a process operation for forming a group card by the server 4.

At first step S51, the server 4 receives a group member list on which group member is described, and also a group card forming request.

At step S52, the user information of the group member is acquired from the user managing DB 7 using the received member list. For example, while a nickname described in the group member list is used as a keyword, the user managing DB 7 is retrieved to specify a user, and thus user information is acquired. At this time, the server 4 limits the information which is contained in a group card to be formed in response to an access level of user information. Alternatively, as to an item on which the group card forming request user is not accessible, the user information may not be open to other group members. Further, even as to such an item the forming request user permits to open the user information, when other group members do not open the same item, this item may not be opened.

At step S53, a determination is made as to whether or not the snapshot forming request is involved in the group card forming request. When this snapshot forming request is not contained in the group card forming request, the process operation is advanced to step S54. Conversely, when this snapshot forming request is contained, the process operation is advanced to step S61.

At step S54, identification information that is notified only to the users who are designated in the group corresponding to the formed group card in order to avoid such a problem that the group card may be forged by a third party.

At step S55, such a group card is formed with both the user information and the identification information. It should be noted that some user information may be available only to a limited number of users (depending upon access levels of respective items). Therefore, the contents of a group card for user A may not be the same as user B.

At step S56, both a group card forming completion notification and a group card ID are sent to the user terminals of the users who constitute the above-described group.

At steps S57 and S58, the server 4 waits for a group card send request issued from a user terminal of another group member except for the group card forming request user until pre-selected time T has passed.

At step S59, the group card is sent together with the identification information to the user terminal which requests to transmit the group card.

When it is so judged at the above step S53 that both forming of the group card and forming of the snapshot are requested, the process operation is advanced to step S61.

At this step S61, the image request used to form the snapshot is transmitted to the user terminal for the above group members, and when the image files are received from the user terminals, these image files are complied with each other to form the snapshot.

At step S62, a check is done as to whether or not an ID of a decoration frame is transmitted together with the image file. When the ID of the decoration frame is transmitted, the process operation is advanced step S63. Conversely, when the ID of the decoration frame is not transmitted, the process operation is advanced to step S65.

At this step S63, while using the received decoration frame ID, the designated decoration frame is read from the auxiliary information DB 7.

At step S64, the snapshot formed at the above step S61 is combined with the decoration frame read at step S63 to produce a snapshot with a frame.

At step S65, either the snapshot formed at step S61 or the snapshot with the frame formed at step S64 is transmitted to the user terminal of the group member.

At step S66, the server 4 waits for receiving a snapshot decision notification, a symbol file decision notification, preview change information, and decoration file change information, which are transmitted from the user terminal.

At step S67, a determination is made as to whether or not the received information corresponds to the snapshot decision notification. When this received information is not equal to the snapshot decision notification the process operation is returned to step S62. Then server 4 changes the snapshot based on the received change information. Conversely, when this decision notification is received, the process operation is advanced to step S68.

At step S68, the server 4 transmits the snapshot decision notification to the user terminal of the group member. As a result, the user terminal can recognize that the snapshot is determined.

Subsequently, the process operations defined at the previous steps S54 to S59 are carried out to transmit the group card with the snapshot to the user terminal.

There are some possibilities that an external communication apparatus such as a telephone set and a facsimile machine is connected to the user terminal 2, depending upon user environments. In this case, a contact may be made with using a means desired by group members (namely, disclosed contact destination) while using the group card formed in accordance with the above-described sequence. FIG. 22 is a flow chart for describing a contact process operation executed when a communication is established between the user terminal 2 and another group member.

When a group card is formed, the formed group card is displayed on the "grouping window". Since one of the formed group cards is selected and the "contact" button of the operation palette is depressed, the contact process is commenced. Now, a description will be made of the following case. That is, as indicated in FIG. 17, the user "KENICHI" selects such a group card containing "TAKAKO" and "Kei" as other group members.

First, at step S71, the "contact window" shown in FIG. 17 is displayed, and the contact process operation waits for entries of a contact counter party, a contact means, and if necessary, a transmission message.

For instance, the check box of the telephone pager owned by "TAKAKO" and the check box of the electronic mail address of "Kei" are clicked, and further the transmission message is entered into the "transmission message window"

by using the keyboard. Thereafter, when the "contact" button is depressed, the contact process operation is advanced to step S72.

At step S72, a determination is made as to whether or not the necessary item is entered. If the necessary item is not yet inputted, then the contact process operation is again returned to the previous step S71 so as to wait for a further entry. Conversely, when the necessary item is entered, the contact process operation is advanced to step S73.

At step S73, a contact is commenced to the selected counter party by the selected means. In other words, the transmission message, the mail address of the counter party, and also the telephone number of the pager are transferred to the external application program (namely, telephone pager transmission program and electronic mail program) set to the user terminal of the present user ("KENICHI") in order to start the communication. The message entered into the transmission message window is sequentially transmitted to "TAKAKO" via the telephone pager, and to "Kei" via the electronic mail.

At step S74, a determination is made as to whether or not the communication to all of the selected users is completed. When the communication to all of these selected users is not yet accomplished, the contact process operation is returned to step S73. Conversely, when this communication is accomplished, the contact process operation is advanced to a further step S75.

At this step S75, a post process operation of the used external communication apparatus is carried out, and then the contact process operation is ended.

Alternatively, when a telephone is selected, there is possible case that a user telephones to a first counter party and hangs up the telephone line, and thereafter this user telephones a second counter party. There is another possible case that a message is sent to a facsimile of a counter party. When a telephone is selected, a character string written in a message box cannot be sent in the normal system arrangement. However, for instance, this message may be transferred to the counter party as a speech by using an electronic appliance such as a speech synthesizing unit.

In such a case that a certain change is made in the user information described in the group card, a user wishes to change only the content of the previously formed group card. FIG. 23 is a flow chart for explaining a process operation executed in a user terminal in the case that user information of an own user described in a group card is changed. It should be understood that in the embodiment, user information of other users cannot be changed by the present user and the present user cannot change user information of other users.

On the screen formed after the group cards shown in FIG. 16 have been produced, any one of the group cards is selected and the "change" button of the operation palette is depressed, so that the group card changing process operation is commenced.

First, at step S81, the "personal information window" exemplified in FIG. 12 is displayed, and the user terminal accepts an input of change information made by the user. At this time, the following condition has been set. That is, the previously registered attribute value is displayed as the attribute value of the user information of "personal information window", and the entry of "decision" button can be accepted. If the image file is changed, then the image information related to the present user within the snapshot can be changed.

At step S82, since the "decision" button is depressed by the user, the group members of the selected group card are read out from the storage apparatus 23. The read group members, the attribute value of the changed user information, and the identification information of the group card are transmitted together with the change request to the server 4.

Figure 24:
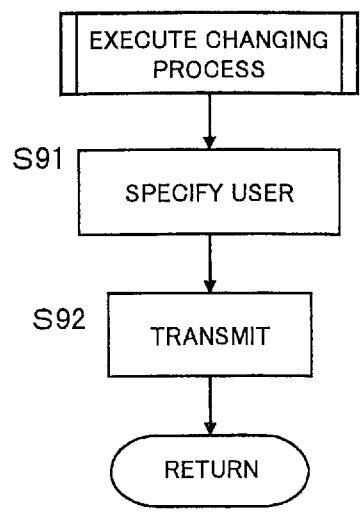
FIG. 24 is a flow chart showing steps in a group card changing process operation executed by the server.

FIG. 24 is a flow chart for describing a process operation executed in the server when the user information described in the group card is changed. Since the server receives a group member, changed user information, identification information together with a change request of a group card, this process operation is started.

First, at step S91, a user name of the group member is acquired from the information transmitted from the user terminal.

At step S92, the identification information of the group card and the change information are transmitted to the user terminal.

Figure 25:
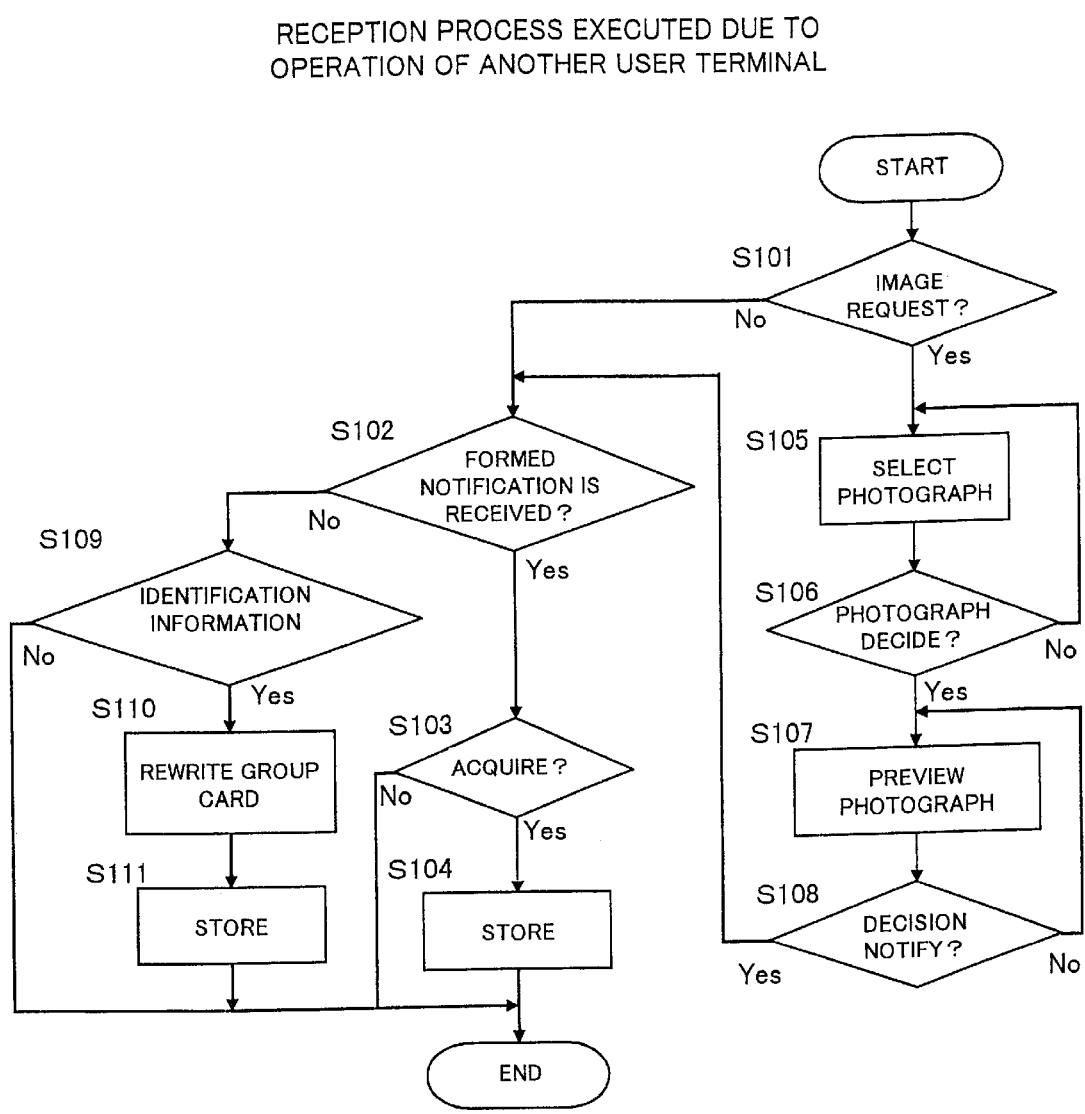
FIG. 25 is a flow chart showing steps in a reception process operation executed by the user terminal.

FIG. 25 is a flow chart for explaining a reception process operation executed by a user terminal which receives information in accordance with operation of another user terminal. In the user terminal, the above-described normal main processing operation and the below-mentioned reception process operation are independently carried out.

First, the reception process operation is commenced when a forming completion notification of a group card is received in response to a request of another user, a symbol request notification issued by another user who requests to form a snapshot, or a change notification of a group card issued by another user terminal.

At step S101, a determination is made as to whether or not the received notification is equal to the image request notification. If the received notification is not equal to the image request notification, the reception process operation is advanced to step S102. Conversely, when the received notification is equal to the image request notification the reception process operation is advanced to step S105 (as is described in greater detail below).

At step S102, a determination is made as to whether or not the received notification is equal to the card forming completion notification issued from the server 4. If the received notification corresponds to the card group forming completion notification, then the reception process is advanced to step S103. Conversely, if the received notification is not equal to the card forming completion notification, then the reception process operation is advanced to a further step S109.

At the step S103, a confirmation is made as to whether or not the notified group card is acquired with respect to the user. In such a case that an acquisition response is entered from the user, a group card transmission request is sent to the server 4 together with the group card ID notified in combination with then group card forming completion notification. Then, the reception process is advanced to step S104. Conversely, in the case that a non-acquisition response is inputted from the user, this response is transmitted to the server 4 and the reception process is ended.

At step S104, the group card sent from the server 4 is acquired by the content acquiring means 9. The acquired group card is loaded on the memory of the user terminal, and then is visually displayed as the group card as shown in the group card window of FIG. 16. Also, the content of the group card is permanently saved in the storage means 23 such as a magnetic disk.

When it is so determined at step S101 that the image request notification has been received, the reception process is advanced to step S105. At this step S105, similar to the above step S37, the "snapshot window" indicated in FIG. 15 is displayed, and this reception process operation accepts the selections of the image file and the decoration frame by the user.

At step S106, a check is made as to whether or not the "photograph decision" button is depressed. If this button is depressed, then the selected symbol file and the selected decoration frame ID are transmitted. Conversely, if this button is not depressed, then the reception process is returned to the above-explained selection stage defined at step S105.

Similar to the above step S39, at step S107, the user terminal receives the snapshot formed by the server 4, and then displays this received snapshot on the "snapshot preview window". Then, the user terminal waits for a change in a snapshot made by the user, and a preview decision notification issued from the server.

At step S108, a determination is made as to whether or not the snapshot decision notification issued form the server 4 is received by the user terminal. When it is so determined that the snapshot decision notification is received, the process operation is advanced to the previous step S102 at which the user terminal waits for the group card forming notification. Conversely, if the snapshot decision notification is not yet received, then the reception process is returned to the previous step S107. At this step S107, while displaying the preview representation of the snapshot, the user terminal waits for the snapshot decision notification.

When it is determined at step S102 that the received notification is not equal to the group card forming completion notification, the reception process is advanced to step S109. At this step S109, another determination is made as to whether or not the received notification is equal to the group card change notification. If this received notification is equal to the group card change notification then the reception process is advanced to step S110. In other cases, this reception process is ended.

At step S110, a seek operation is made of such a group card that a card ID is made coincident with identification information. If there is no group card such that the card ID is not made coincident with the identification information, then the reception process is ended. Conversely, when there is such a group card that the card ID is made coincident with the identification information, the relevant information of the group card stored in the storage means 23 is rewritten by the change information.

At step S111, the changed group card is stored into the storage means 23, and then the reception process is accomplished.

(a). In the above-explained embodiment, the predetermined user information is registered into the server 4. Another method may be employed in the present invention. For instance, while only the nicknames are registered into the server 4, this server 4 may request the group contact program-operated on the user terminal 2 to acquire the user information, if required.

In the case that the group card is actually formed in such an arrangement that the user information is not registered into the server, the server 4 will negotiate with the group contact program operated on the respective user terminal 2 to thereby acquire the user information.

(b). In the above-explained embodiment, the server of the chat application software is identical to the server of the group contact system according to the present invention. Alternatively, the first-mentioned server is not always made coincident with the last-mentioned server. In the case that both the servers are different from each other, the user information saved in the server of the chat application software must be related to the user information saved in the server according to the present invention by using a certain method. For example, the same ID with using the same nickname may be employed.

(c). As the symbol file used to form the snapshot, various data may be used other than the image file stored in the user terminal. For instance, while expressions of the respective users are imaged by using a plurality of distributed communication apparatuses and video cameras connected to these communication apparatuses, a communicative picture is formed by being previewed within a decoration frame on a screen of each appliance, if necessary. Then, the finally produced commemorative picture may be outputted from the respective distributed appliances.

(d). In the above-described embodiment, the server 4 does not hold the formed group cards. As a consequence, when the change is made in the group cards, the identification process operation is carried out on the user terminal side, and then the group card is newly formed. However, while the group cards are saved in the server 4, both the identification process operation and the change in the group card may be carried out on the server side.

(e). In the above-explained embodiment, the content of the group card may be changed and also the attribute value of the user information registered into the server 4 may be changed.

In accordance with the present invention, since other users can be grouped based upon the intention/view point of the user himself, the same group of human relationship may be readily handled as a single group. The contact can be established with employment of the information of the grouped user after the connection with the server is ended. Also, the commemorative picture may be formed among the users. Accordingly, the close friendship between users can be improved, and the communications can be made active. Since the information about the grouped users is visually made, the human relationship can be clearly displayed. Various communications based on the human relationship can be readily carried out.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A group contact system comprising:
    a plurality of first information terminals each being configured for a respective user to communicate via a communication service over a network; and
    a second information terminal connected to the network, said second information terminal being configured for management of the communication service; wherein:
    each of said first information terminals comprises:
        means for selecting members of a user group by selecting a user for designating at least one other user as a designated user so as to form the user group including one or more designated users and also the selecting user, said selecting means also for designating user information about the selecting user and each designated user in the user group to be compiled as a user group information,
        each designated user and the selecting user accessing the communication service from respective ones of said first information terminals;

said second information terminal comprises:
user information storing means for storing user information, said user information comprising information identifying each user and a corresponding one of said first information terminals on said network utilized by the user to access the communication service; and
means for allowing a user in the user group to request compiling the user group information based upon the user information designated at said first information terminal.

2. The group contact system as set forth in claim 1, wherein each of said first information terminals further includes means for acquiring the contents of the compiled user group information relating to each of the designated users in the user group from said second information terminal.

3. The group contact system as set forth in claim 2 wherein:
said first information terminal further includes acquisition confirming means configured to receive notification of compiled user group information to be transmitted from said second information terminal, and said acquisition confirming means being further formed to notify to said content acquiring means of incoming transmission of the compiled user group information; and
said content acquiring means further being configured to receive said user group information based upon notification issued from said acquisition confirming means.

4. The group contact system as set forth in claim 2 wherein:
said first information terminal is connected to an external communication apparatus; and
said first information terminal further includes:
communication control means configured to access said external communication apparatus in response to selection by the corresponding user at said first information terminal of one designated user of the compiled user group information, said communication control means being further configured to contact said one designated user via said external communication apparatus.

5. The group contact system as set forth in claim 2, wherein said second information terminal further includes identification information forming means for forming said information identifying each user in said user group information.

6. The group contact system as set forth in claim 2 wherein:
said first information terminal further includes:
snapshot forming instruction means for processing instructions relating to formation of a snapshot, said snapshot to contain images representing each of the designated users in the user group, said snapshot forming instruction means also being configured for transmitting the instructions to said second information terminal; and
said second information terminal further includes:
snapshot forming means configured for forming said snapshot in response to the instructions from said snapshot forming instructions means, said snapshot forming means being configured to compile image information about each designated user in the user group to produce a snapshot, and said snapshot forming means being further configured for transmitting said snapshot to each said first information terminals designated in said user group information of said user group, and said snapshot forming means being further configured for compiling user group information having said snapshot.

7. The group contact system as set forth in claim 6 wherein:
said first information terminal further includes auxiliary information selecting means for selecting auxiliary visual information to be added to said snapshot and also for adding said selected auxiliary visual information to the instructions sent to said snapshot forming means; and
said second information terminal further includes:
a storage apparatus for storing therein contents of said auxiliary visual information; and
information adding means for reading the contents of said selected auxiliary visual information from said storage apparatus and also for adding the read contents to said snapshot.

8. The group contact system as set forth in claim 2 wherein:
said first information terminal further includes output means for visually outputting the user group information stored by said content acquiring.

9. A group contact managing apparatus for managing user information communicated between a plurality of information terminals, the information terminals communicating with each other via a communication service over a network, said user group contact managing apparatus comprising:
user group information forming means for receiving a user group information forming request by a user from any one of the information terminals, the user group information forming request having a user group list identifying designated users who define a user group, each of the designated users accessing the communication service from respective said information terminals, said user group information forming means further configured for forming user group information containing user information relating to each of said designated users in response to a request by a user in the user group, and said user group information forming means further configured for transmitting compiled user group information to the information terminals of said designated users.

10. A group contact apparatus connected to an information server which manages information related to users and their respective information terminals, the information server providing a communication service to the information terminals over a network, the group contact apparatus comprising:
user group information forming instructions means configured for allowing a user to designate users in communication with the communication service to form a user group, said user group information forming instructions means also configured for allowing a user in the user group to request said information server to form user group information simultaneously with the operation of the communication service between a plurality of user group contact apparatuses; and
content acquiring means for acquiring formed user group information from said information server and saving the acquired user group information in storage.

11. A computer readable recording medium for recording thereon a user group contact management program employed in a second information terminal for managing user information communicated between a plurality of first information terminals which mutually and commonly communicate with one another via a communication service operated from the second information terminal, said user group contact management program executing the following process:

storing information related to users at each of the first information terminals;

compiling user group information in response to a request from any one of the users at the first information terminals, the request including a designation of users accessing the communication service who have been selected to be in a user group, the user group information including user information about each designated user; and transmitting the compiled user group information to each first information terminal corresponding to a respective one of the designated users.

12. A computer readable recording medium for recording thereon a user group contact program employed in a first information terminal, a plurality of the first information terminals being mutually and commonly in communication with one another via a communication service operated from a second information terminal, said user group contact program executing the following process:

designating by a selecting user at least one user as a designated user from users communicating via the communication service, the designated users and the selecting user to subsequently define a user group, the first communication terminal thereafter transmitting formed instructions of a user in the user group to the second communication terminal for subsequent formation of user group information based upon the formed instructions;

allowing continued communication between respective ones of said first information terminals; and acquiring contents of the subsequently formed user group information formed in response to the designating by the selecting user.

13. A user group communication method for effecting selection, designation and compilation of user group information in conjunction with a communication service operated over a network communication system in which a plurality of users commonly communicate via the communication service, comprising:

operating a communication service;

collecting user information from a plurality of users accessing the communication service and storing the information in a common storage space;

selecting by a user at least one user from users accessing the communication service, the selected users defining a group of users;

allowing a user in the user group to request user group information be compiled from the user information corresponding to the users in the user group; and compiling user group information corresponding to the users in the user group in response to the compiling request.

14. The method as set forth in claim 13, further comprising:

forming a snapshot that includes image information corresponding to each user in the user group, the formed snapshot combined with the compiled user group information; and transmitting the compiled user group information and snapshot to each of the users in the user group.

15. The method as set forth in claim 14, wherein the compiling request further includes designation of a background for insertion into the formed snapshot.

16. A computer readable storage controlling a computer and comprising a process of allowing a user to designate users in communication with each other and the designating user via a networked communication service, allowing formation of a user group based upon the designated users and the designating user, allowing a user in the user group to transmit a user group profile command to another computer to compile user group information relating to the user group, and acquiring user group information of the formed user group responsive to the user group profile command.

\* \* \* \* \*

UNITED STATES PATENT AND TRADEMARK OFFICE
CERTIFICATE OF CORRECTION

PATENT NO. : 6,714,965 B2
DATED : March 30, 2004
INVENTOR(S) : Jun Kakuta et al.

It is certified that error appears in the above-identified patent and that said Letters Patent is hereby corrected as shown below:

Title page,
Item [54], Title, change "GROUP CONTACTING SYSTEM, AND RECORDING MEDIUM FOR STORING COMPUTER INSTRUCTIONS FOR EXECUTING OPERATIONS OF THE CONTACT SYSTEM" to -- A GROUP CONTACT SYSTEM, AND RECORDING MEDIUM FOR STORING COMPUTER INSTRUCTIONS FOR EXECUTING OPERATIONS OF THE CONTACT SYSTEM --.

Signed and Sealed this

Seventh Day of September, 2004

JON W. DUDAS
*Director of the United States Patent and Trademark Office*